United States Patent
Okamoto et al.

(10) Patent No.: US 8,421,874 B2
(45) Date of Patent: Apr. 16, 2013

(54) IMAGE PROCESSING APPARATUS

(75) Inventors: Masayoshi Okamoto, Daito (JP); Jun Kiyama, Higashiosaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 386 days.

(21) Appl. No.: 12/890,405

(22) Filed: Sep. 24, 2010

(65) Prior Publication Data

US 2011/0069195 A1   Mar. 24, 2011

(30) Foreign Application Priority Data

Sep. 24, 2009  (JP) ................... 2009-218487

(51) Int. Cl.
*H04N 5/235*  (2006.01)
(52) U.S. Cl.
USPC ........................................ 348/222.1; 382/167
(58) Field of Classification Search .............. None
See application file for complete search history.

(56) References Cited

U.S. PATENT DOCUMENTS

| | | | | |
|---|---|---|---|---|
| 6,081,254 A | * | 6/2000 | Tanaka et al. | 382/167 |
| 2006/0088210 A1 | * | 4/2006 | Yu et al. | 382/167 |
| 2007/0070214 A1 | * | 3/2007 | Nakamura | 348/222.1 |

FOREIGN PATENT DOCUMENTS

| JP | 2009-044526 | 2/2009 |
|---|---|---|
| JP | 2009-058837 | 3/2009 |

* cited by examiner

*Primary Examiner* — Chieh M Fan
*Assistant Examiner* — Angel L Garces-Rivera
(74) *Attorney, Agent, or Firm* — Novak Druce Connolly Bove + Quigg LLP

(57) ABSTRACT

An image processing apparatus includes a fetcher. A fetcher fetches an object scene image. A first adjuster adjusts a tonality of the object scene image fetched by the fetcher, corresponding to a property of a display device. An object scene image outputter outputs the object scene image having the tonality adjusted by the first adjuster, toward the display device. A second adjuster adjusts the tonality of the object scene image fetched by the fetcher, in parallel with the adjusting process of the first adjuster. A first searcher searches for an object image that coincides with a registered object image from the object scene image having the tonality adjusted by the second adjuster.

12 Claims, 25 Drawing Sheets

FIG.5

RGST1

| γ CORRECTION CURVE |
|---|
| CV_0 |

FIG.6

EXDC

| FP_1 | EGYPTIAN MAU |
|---|---|
| FP_2 | AMERICAN SHORTHAIR |

FIG.7

RGST2

| No. | POSITION | SIZE |
|---|---|---|
| 1 | | |
| 2 | | |
| ⋮ | ⋮ | ⋮ |

(A) DISPLAY IMAGE (B) SEARCH IMAGE (A) DISPLAY IMAGE (B) SEARCH IMAGE (A) ORIGINAL IMAGE

RF1

(B) ZOOM & SCROLL IMAGE

GLDC

| DOG | | CAT | | RABBIT | |
|---|---|---|---|---|---|
| FP_1 | AFGHAN HOUND | FP_46 | MAINE COON | FP_61 | NETHERLAND DWARF |
| FP_2 | PAPILLON | FP_47 | TURKISH ANGORA | FP_62 | MINI REX |
| FP_3 | POMERANIAN | FP_48 | RUSSIAN BLUE | FP_63 | LION LOP |
| ⋮ | ⋮ | ⋮ | ⋮ | ⋮ | ⋮ |
| FP_45 | SIBERIAN HUSKY | FP_60 | MINSKIN | FP_70 | JERSY WOOLY |

FIG.16

(A)
TMP 0

| IDENTIFICATION NUNMBER (=L) | | | | | | |
|---|---|---|---|---|---|---|
| CHECKING DEGREE | | | | | | |

(B)
TMP 1

| IDENTIFICATION NUNMBER (=L) | | | | | | |
|---|---|---|---|---|---|---|
| CHECKING DEGREE | | | | | | |

(C)
TMP 2

| IDENTIFICATION NUNMBER (=L) | | | | | | |
|---|---|---|---|---|---|---|
| CHECKING DEGREE | | | | | | |

(D)
TMP 3

| IDENTIFICATION NUNMBER (=L) | | | | | | |
|---|---|---|---|---|---|---|
| CHECKING DEGREE | | | | | | |

FIG.17

EXDC

| FP_1 | SIBERIAN HUSKY |
|---|---|
| FP_2 | ALASKAN MALAMUTE |

FIG.18

RGST1

| $\gamma$ CORRECTION CURVE |
|---|
| CV_3 |

(A) DISPLAY IMAGE (B) SEARCH IMAGE

IMAGE PROCESSING APPARATUS

CROSS REFERENCE OF RELATED APPLICATION

The disclosure of Japanese Patent Application No. 2009-218487, which was filed on Sep. 24, 2009, is incorporated herein by reference.

BACKGROUND OF THE INVENTION

1. Field of the Invention

The present invention relates to an image processing apparatus. More particularly, the present invention relates to an image processing apparatus which is applied to a digital camera and which searches for an object image that coincides with a registered object image from an object scene image.

2. Description of the Related Art

According to one example of this type of apparatus, a human-region detecting section detects a face region of a human existing in a region to be photographed by referring to an image inputted from an image input section. Moreover, a brightness-variation-region detecting section divides the image inputted from the image input section into local regions, and evaluates a distribution of a temporal change of brightness information in each of the local regions. An input control section controls an input-image adjustment element based on detection results of these detecting sections.

On the other hand, a human-feature extracting section extracts feature information of the face of the human from the face region detected by the human-region detecting section. A recognizing section checks the extracted feature information of the face of the human with previously-registered feature information of a face of a human so as to recognize the human existing within the region to be photographed.

However, in the above-described apparatus, a common input image having a quality that follows the input-image adjustment element is referred to in each of the input control section and the recognizing section. Thus, depending on a color of the face of the human, there is a possibility that either one of a performance of reproducing the face image or a performance of searching for the face image is deteriorated.

SUMMARY OF THE INVENTION

An image processing apparatus according to the present invention comprises: a fetcher which fetches an object scene image; a first adjuster which adjusts atonality of the object scene image fetched by the fetcher, corresponding to a property of a display device; an object-scene-image outputter which outputs the object scene image having the tonality adjusted by the first adjuster, toward the display device; a second adjuster which adjusts the tonality of the object scene image fetched by the fetcher, in parallel with the adjusting process of the first adjuster; and a first searcher which searches for an object image that coincides with a registered object image from the object scene image having the tonality adjusted by the second adjuster.

The above described features and advantages of the present invention will become more apparent from the following detailed description of the embodiment when taken in conjunction with the accompanying drawings.

BRIEF DESCRIPTION OF THE DRAWINGS

FIG. 5 is an illustrative view showing one example of a configuration of a register referred to in contrast adjusting behavior;

FIG. 6 is an illustrative view showing one example of a configuration of an extraction dictionary;

FIG. 7 is an illustrative view showing one example of a register referred to in face detecting behavior;

FIG. 13 is an illustrative view showing one example of a configuration of a general dictionary;

FIG. 16(A) is an illustrative view showing one example of a temporary register referred to in extraction-dictionary creating behavior;

FIG. 16(B) is an illustrative view showing another example of the temporary register referred to in the extraction-dictionary creating behavior;

FIG. 16(C) is an illustrative view showing still another example of the temporary register referred to in the extraction-dictionary creating behavior;

FIG. 16(D) is an illustrative view showing yet another example of the temporary register referred to in the extraction-dictionary creating behavior;

FIG. 17 is an illustrative view showing another example of the configuration of the extraction dictionary;

FIG. 18 is an illustrative view showing another example of the configuration of the register referred to in the contrast adjusting behavior;

DETAILED DESCRIPTION OF THE PREFERRED EMBODIMENTS

Figure 1:
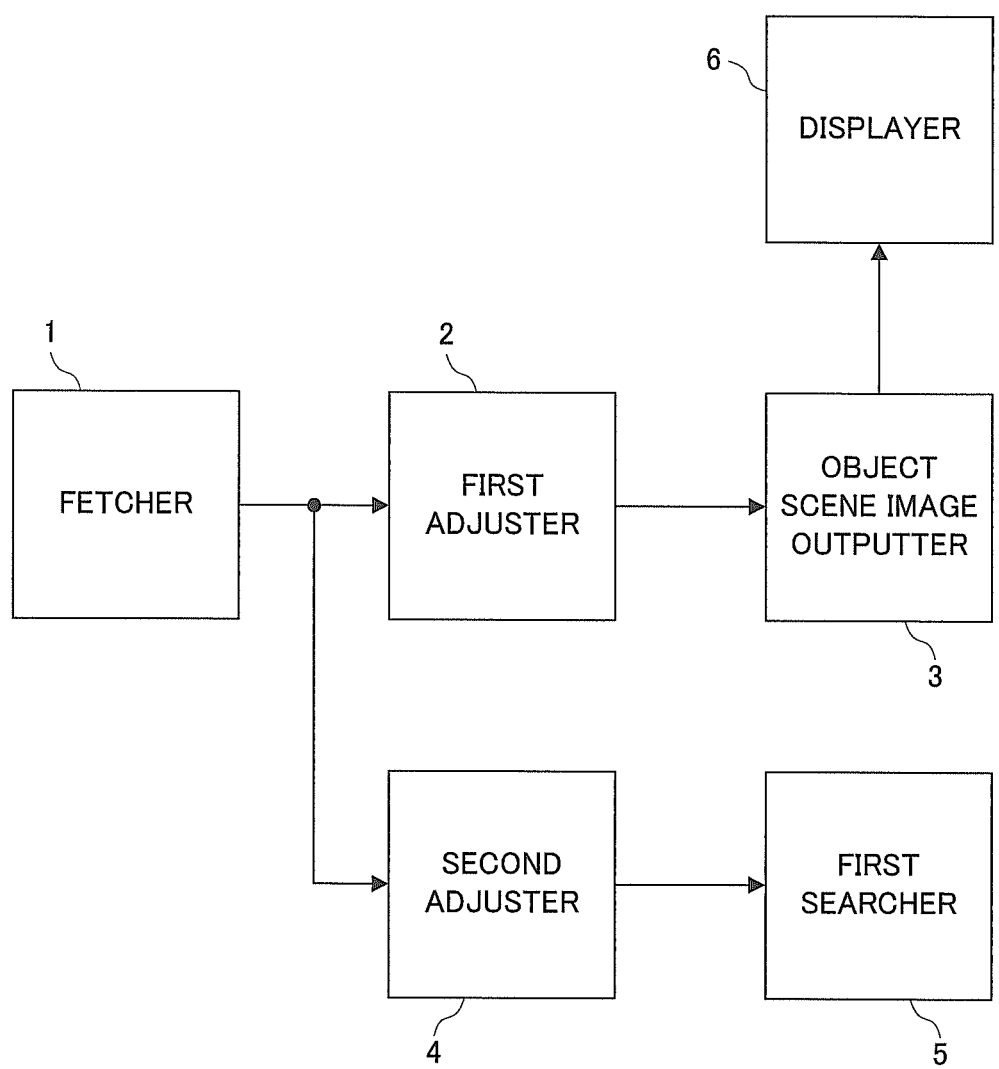
FIG. 1 is a block diagram showing a basic configuration of one embodiment of the present invention.

With reference to FIG. 1, an image processing apparatus of one embodiment of the present invention is basically configured as follows: A fetcher 1 fetches an object scene image. A first adjuster 2 adjusts a tonality of the object scene image fetched by the fetcher 1, corresponding to a property of a display device 6. An object scene image outputter 3 outputs the object scene image having the tonality adjusted by the first adjuster 2, toward the display device 6. A second adjuster 4 adjusts the tonality of the object scene image fetched by the fetcher 1, in parallel with the adjusting process of the first adjuster 2. A first searcher 5 searches for an object image that coincides with a registered object image from the object scene image having the tonality adjusted by the second adjuster 4.

Therefore, the tonality of the object scene image outputted toward the display device 6 is adjusted corresponding to the property of the display device 6 while the object scene image that is a subject to be searched of the object image that coincides with the registered object image is adjusted irrespective of the property of the display device 6. This enables improvement of both a performance of reproducing the object image that coincides with the registered object image and a performance of searching for the same.

Figure 2:
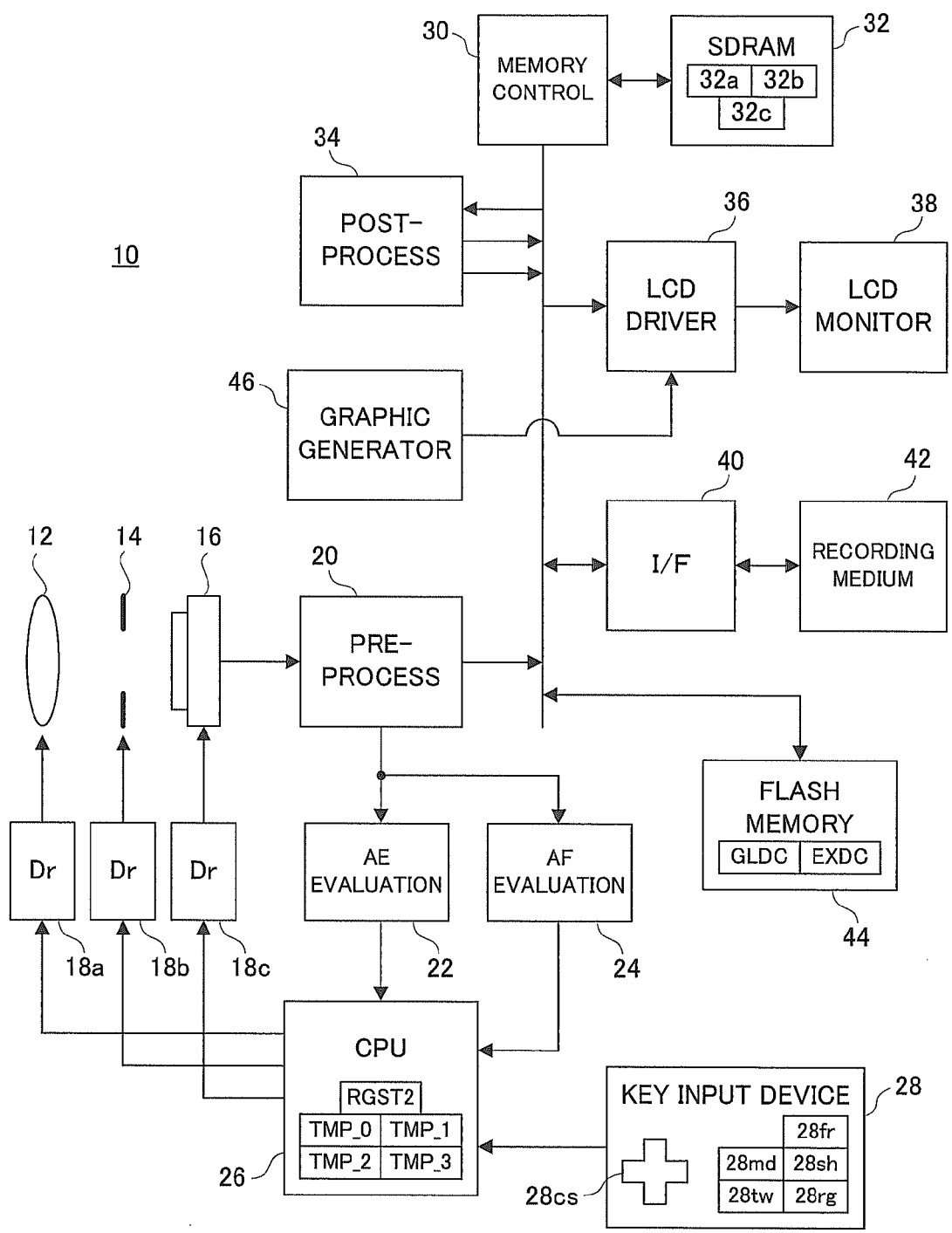
FIG. 2 is a block diagram showing a configuration of one embodiment of the present invention.

With reference to FIG. 2, a digital camera 10 according to this embodiment includes a focus lens 12 and an aperture unit 14 respectively driven by drivers 18a and 18b. An optical image of an object scene that undergoes these components enters, with irradiation, an imaging surface of an imager 16, and is subjected to a photoelectric conversion. Thereby, electric charges representing an object scene image are produced.

When a power source is applied, a CPU 26 determines under a main task a setting (i.e., an operation mode at a current time point) of a mode selector switch 28md arranged in a key input device 28. If the operation mode at a current time point is a camera mode, then an imaging task and a face detecting task are started up, and if the operation mode at the current time point is a reproduction mode, then a reproducing task is started up.

When the imaging task is started up, the CPU 26 commands a driver 18c to repeat exposure behavior and electric-charge reading-out behavior in order to start a moving-image fetching process. In response to a vertical synchronization signal Vsync periodically generated from a Signal Generator (SG) not shown, the driver 18c exposes the imaging surface and reads out the electric charges produced on the imaging surface in a raster scanning manner. From the imager 16, raw image data based on the read-out electric charges is cyclically outputted.

A pre-processing circuit 20 performs processes, such as digital clamp, pixel defect correction, and gain control, on the raw image data outputted from the imager 16. The raw image data on which these processes are performed is written into a raw image area 32a of an SDRAM 32 through a memory control circuit 30.

A post-processing circuit 34 reads out the raw image data accommodated in the raw image area 32a through the memory control circuit 30, performs a color separation process and a white balance adjusting process on the read-out raw image data, and performs a gamma correcting process and a YUV converting process which are for display-use, and a gamma correcting process and a YUV converting process which are for search-use, individually on the image data having the adjusted white balance. Thereby, display image data and search image data that comply with a YUV format are individually created.

The display image data is written into a display image area 32b of the SDRAM 32 by the memory control circuit 30. The search image data is written into a search image area 32c of the SDRAM 32 by the memory control circuit 30.

An LCD driver 36 repeatedly reads out the display image data accommodated in the display image area 32b through the memory control circuit 30, and drives an LCD monitor 38 based on the read-out image data. As a result, a real-time moving image (through image) of the object scene is displayed on a monitor screen. It is noted that a process on the search image data will be described later.

Figure 3:
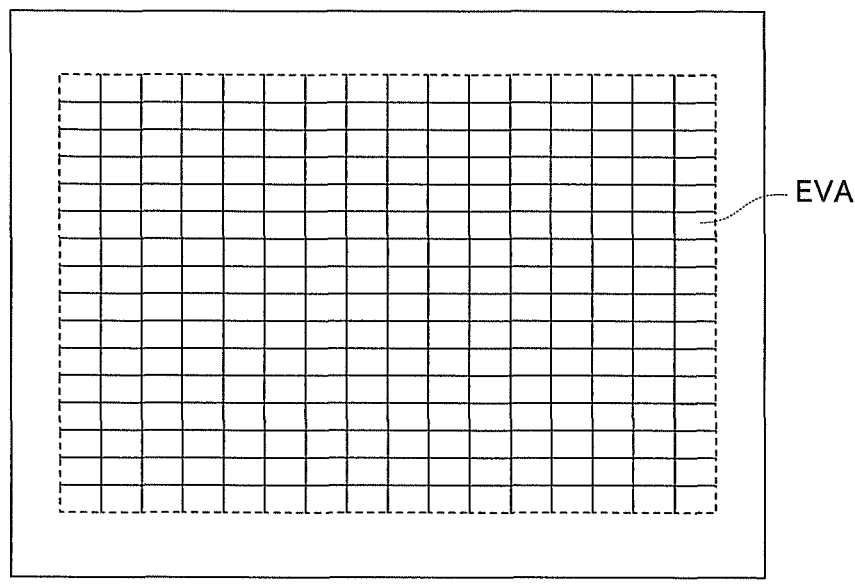
FIG. 3 is an illustrative view showing one example of a state where an evaluation area is allocated to an imaging surface.

With reference to FIG. 3, an evaluation area EVA is allocated to a center of the imaging surface. The evaluation area EVA is divided into 16 portions in each of a horizontal direction and a vertical direction; therefore, 256 divided areas form the evaluation area EVA. Moreover, in addition to the above-described processes, the pre-processing circuit 20 executes a simple RGB converting process for simply converting the raw image data into RGB data.

An AE evaluating circuit 22 integrates RGB data belonging to the evaluation area EVA, out of the RGB data produced by the pre-processing circuit 20, at each generation of the vertical synchronization signal Vsync. Thereby, 256 integral values, i.e., 256 AE evaluation values, are outputted from the AE evaluating circuit 22 in response to the vertical synchronization signal Vsync.

Moreover, an AF evaluating circuit 24 extracts a high-frequency component of G data belonging to the same evaluation area EVA, out of the RGB data outputted from the pre-processing circuit 20, and integrates the extracted high-frequency component at each generation of the vertical synchronization signal Vsync. Thereby, 256 integral values, i.e., 256 AF evaluation values, are outputted from the AF evaluating circuit 24 in response to the vertical synchronization signal Vsync.

The CPU 26 executes a simple AE process that is based on the output from the AE evaluating circuit 22, in parallel with a moving-image fetching process, so as to calculate an appropriate EV value. An aperture amount and an exposure time period that define the calculated appropriate EV value are set to the drivers 18b and 18c, respectively. As a result, a brightness of the through image is adjusted moderately.

When a shutter button 28sh is half-depressed, the CPU 26 executes an AE process based on the output of the AE evaluating circuit 22 so as to calculate an optimal EV value. Similarly to the above-described case, an aperture amount and an exposure time period that define the calculated optimal EV value are set to the drivers 18b and 18c, respectively. As a result, the brightness of the through image is adjusted strictly. Moreover, the CPU 26 executes an AF process that is based on the output from the AF evaluating circuit 24. The focus lens 12 is set to a focal point by the driver 18a, and thereby, a sharpness of the through image is improved.

When the shutter button 28sh is fully depressed, the CPU 26 starts up an I/F 40 for a recording process. The I/F 40 reads out one frame of the display image data representing an object scene that is obtained at a time point at which the shutter button 28sh is fully depressed, from the display image area 32b through the memory control circuit 30, and records an image file in which the read-out display image data is contained onto a recording medium 42.

Figure 4:
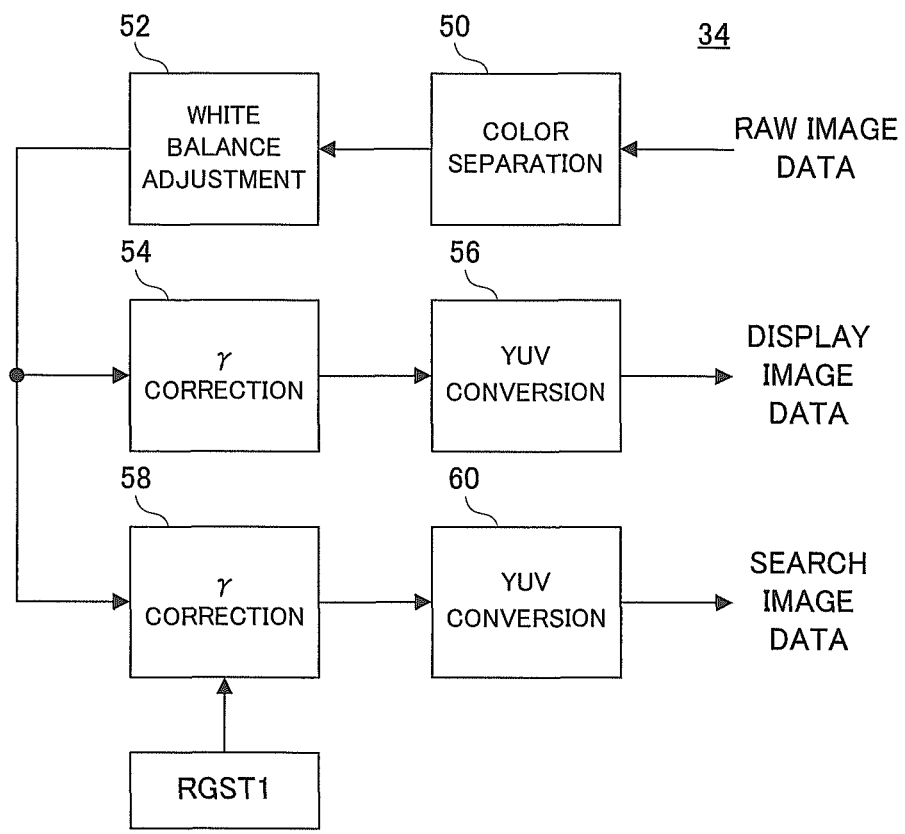
FIG. 4 is a block diagram showing one example of a configuration of a post-processing circuit applied to the embodiment in FIG. 2.

The post-processing circuit 34 is configured as shown in FIG. 4. The raw image data read-out by the memory control circuit 30 is subjected to a color separation process by a color separation circuit 50, and a white balance of the color-separated image data is adjusted by a white-balance adjusting circuit 52. The image data having the adjusted white balance is applied to gamma correcting circuits 54 and 58.

The gamma correcting circuit 54 adjusts a contrast of the image data according to a gamma correction curve that corresponds to a property (color reproducibility) of the LCD monitor 38. The image data having the adjusted contrast undergoes a YUV converting process by the YUV converting circuit 56, and then, is outputted as the display image data.

Figure 14:
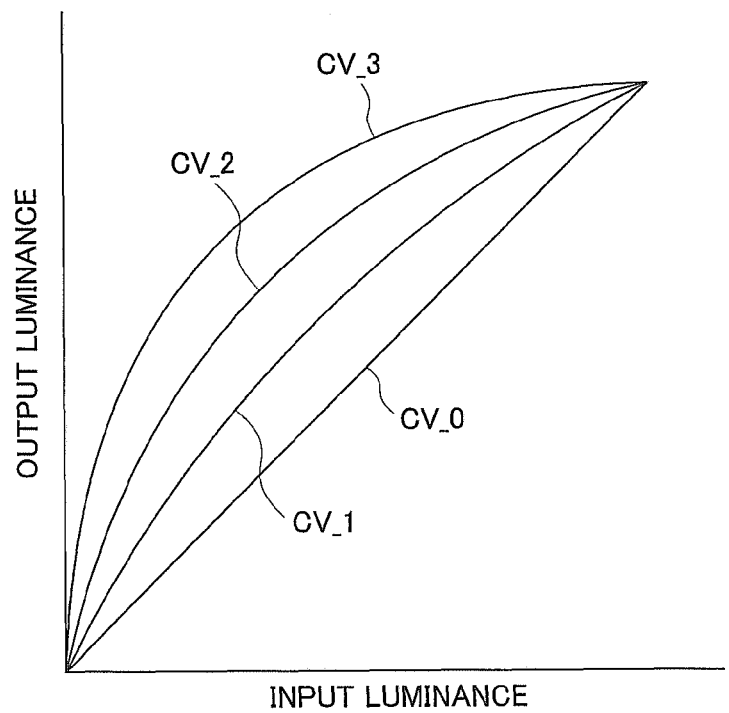
FIG. 14 is a graph showing one example of a gamma correction curve.

On a register RGST1, any one of gamma correction curves CV_0 to CV_3 (details will be described later) shown in FIG. 14 is registered as shown in FIG. 5. The gamma correcting circuit 58 adjusts a contrast of the image data according to the gamma correction curve accommodated on the register RGST1. The image data having the adjusted contrast undergoes a YUV converting process by a YUV converting circuit 60, and then, is outputted as the search image data.

Under the face detecting task executed in parallel with the imaging task, the CPU 26 repeatedly searches for a face image of an animal from the image data accommodated in the search image area 32c. For such a face detecting task, an extraction dictionary EXDC shown in FIG. 6, a register RGST2 shown in FIG. 7, and a plurality of face-detection frame structures FD, FD, FD, . . . shown in FIG. 8 are prepared.

According to FIG. 6, a characteristic of a face of an Egyptian Mau, which is one of the species of cats, is contained as a face pattern FP_1 in the extraction dictionary EXDC, and a characteristic of a face of an American Short Hair, which is another one of the species of cats, is contained as a face pattern FP_2 in the extraction dictionary EXDC. It is noted that in FIG. 6, English words of "Egyptian Mau" and those of "American Short Hair" are described. In reality, however, the characteristic of the face of the Egyptian Mau and that of the face of the American Short Hair are registered.

Furthermore, the register RGST2 shown in FIG. 7 is equivalent to a register used for describing a face-frame-structure information, and is formed by: a column in which a position of the detected face image (position of the face-detection frame structure FD at a time point at which the face image is detected) is described; and a column in which a size of the detected face image (size of the face-detection frame structure FD at a time point at which the face image is detected) is described.

Figure 8:
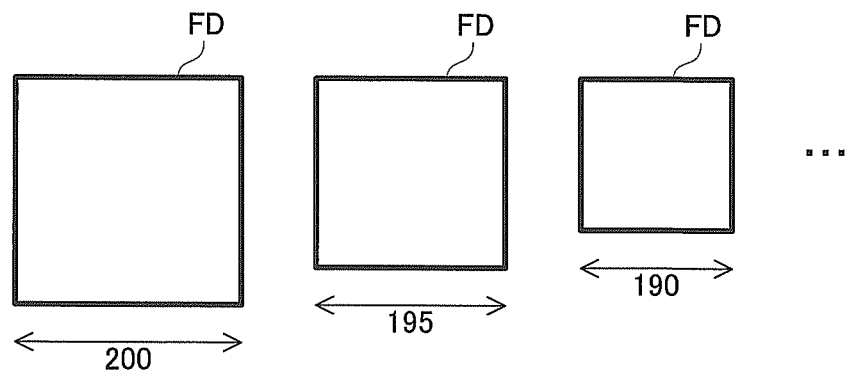
FIG. 8 is an illustrative view showing one example of a face-detection frame structure used for a face recognizing process.
Figure 9:
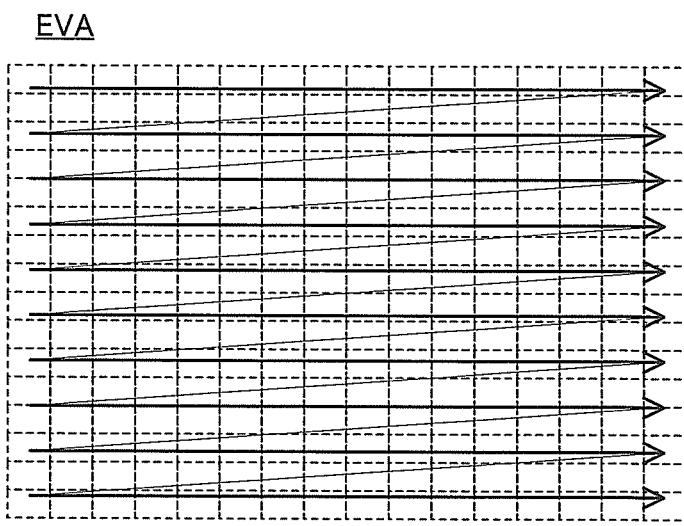
FIG. 9 is an illustrative view showing one portion of the face detecting behavior.

Moreover, the face-detection frame structure FD shown in FIG. 8 moves in a raster scanning manner on the search image area 32c corresponding to the evaluation area EVA shown in FIG. 9 at each generation of the vertical synchronization signal Vsync. The size of the face-detection frame structure FD is reduced by a scale of "5" from "200" to "20" at each time that raster scanning is ended.

The CPU 26 reads out the image data belonging to the face-detection frame structure FD from the search image area 32c through the memory control circuit 30 so as to calculate a characteristic amount of the read-out image data. The calculated characteristic amount is checked with each of the face patterns FP_1 to FP_2 contained in the extraction dictionary EXDC. When a checking degree exceeds a threshold value TH, the position and the size of the face-detection frame structure FD at the current time point are registered, as face-frame-structure information, onto the register RGST2.

When the raster scanning of the face-detection frame structure FD of a minimum size (=20) is ended, the CPU 26 detects the face-frame-structure information registered on the register RGST2, and issues a face-frame-structure character display command corresponding to the detected face-frame-structure information toward a graphic generator 46. However, in a case where there is no face-frame-structure information on the register RGST2, the issuance of the face-frame-structure character display command is cancelled.

The graphic generator 46 creates graphic image data representing a face frame structure, based on the applied face-frame-structure character display command, and applies the created graphic image data to the LCD driver 36. The LCD driver 36 displays a face-frame-structure character KF1 on the LCD monitor 38, based on the applied graphic image data.

Figure 10:
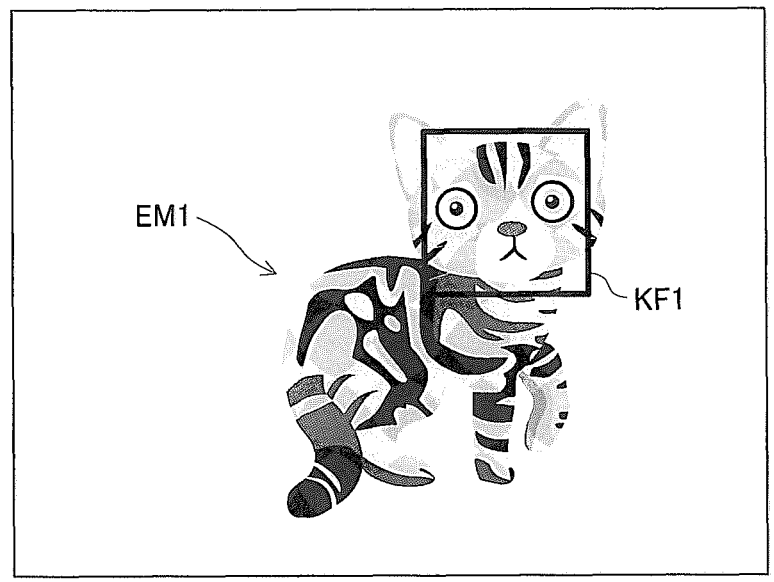
FIG. 10(A) is an illustrative view showing one example of a display image.
FIG. 10(B) is an illustrative view showing one example of a search image.
Figure 10:
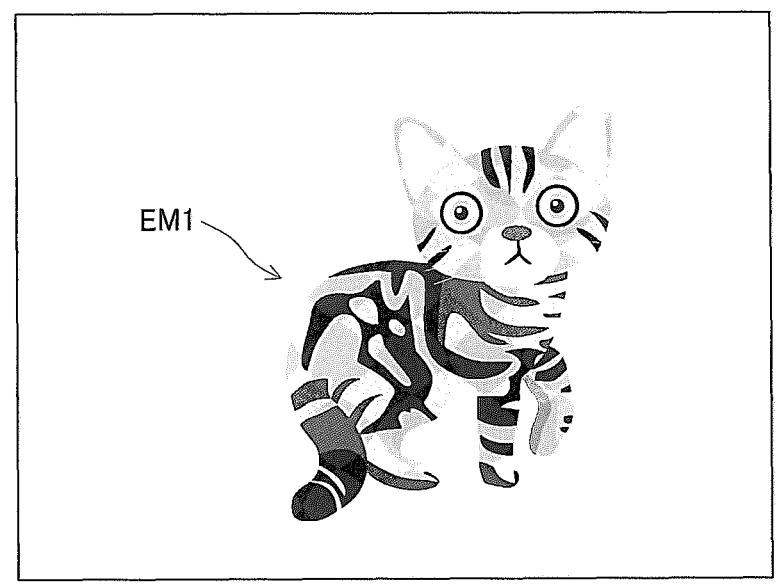

When the Egyptian Mau EM1 is captured on the imaging surface, display image data shown in FIG. 10(A) and search image data shown in FIG. 10(B) are created in parallel to each other. The display image data is subjected to a display process by the LCD driver 36, and the search image data is subjected to a face detecting process by the CPU 26.

As a result of the face detecting process, the checking degree between the characteristic of the face image of the Egyptian Mau EM1 and the face pattern FP_1 shown in FIG. 6 exceeds the threshold value TH. The face-frame-structure character KF1 is displayed on the LCD monitor 38 in a manner to surround the face image of the Egyptian Mau EM1 (see FIG. 10(A)).

Figure 11:
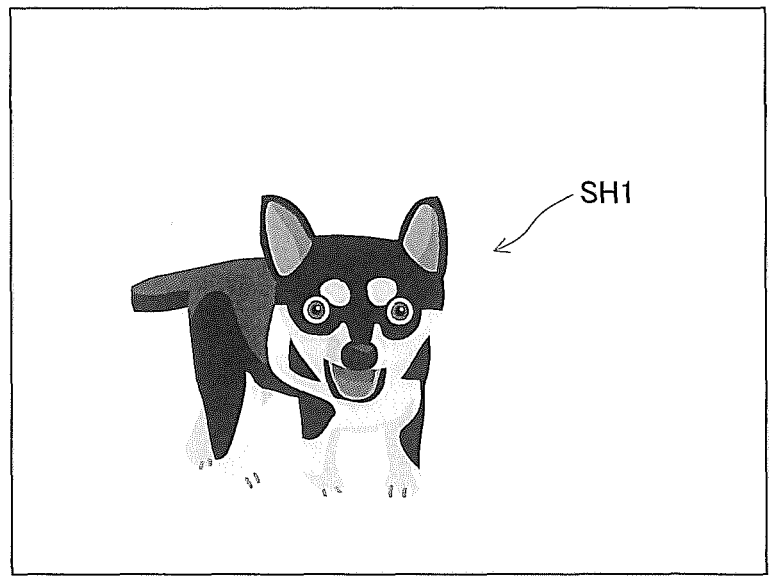
FIG. 11(A) is an illustrative view showing another example of the display image.
FIG. 11(B) is an illustrative view showing another example of the search image.
Figure 11:
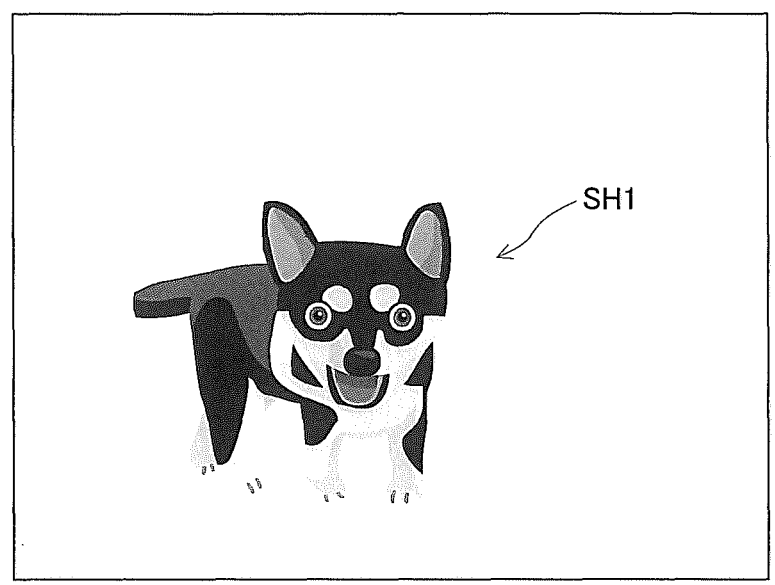

On the other hand, when the Siberian Husky SH1 is captured on the imaging surface, display image data shown in FIG. 11(A) and search image data shown in FIG. 11(B) are created in parallel to each other. As described above, the display image data is subjected to the display process by the LCD driver 36, and the search image data is subjected to the face detecting process by the CPU 26.

However, both the checking degrees between the characteristic of the face image of the Siberian Husky SH1 and each of the face patterns FP_1 and FP_2 shown in FIG. 6 fall below the threshold value TH. Therefore, the face-frame-structure character KF1 is to be non-displayed (see FIG. 11(A)).

When the face-frame-structure character KF1 is displayed, the above-described AE process and AF process are executed by noticing the image within the face-frame-structure character KF1. On the other hand, when the face-frame-structure character KF is non-displayed, the above-described AE process and AF process are executed by noticing the whole image of the evaluation area EVA. Thus, imaging parameters such as an exposure amount and a focus are satisfactorily adjusted.

When the reproducing task is started up, the CPU 26 designates the latest image file recorded on the recording medium 42, as a reproduced-image file, and commands the FE 40 and the LCD driver 36 to execute a reproducing process in which the designated image file is noticed.

The I/F 40 reads out the image data of the designated image file from the recording medium 42, and writes the read-out image data into the display image area 32*b* of the SDRAM 32 through the memory control circuit 30.

The LCD driver 36 reads out the image data accommodated in the display image area 32*b* through the memory control circuit 30, and drives the LCD monitor 38 based on the read-out image data. As a result, a reproduced image based on the image data of the designated image file is displayed on the LCD monitor 38.

Following such a reproducing process, the CPU 26 issues a registration-frame-structure character display command toward the graphic generator 46. The graphic generator 46 creates graphic image data representing a registration frame structure, based on the applied registration-frame-structure character display command, and applies the created graphic image data to the LCD driver 36. The LCD driver 36 displays the registration-frame-structure character RF1 at a center of the screen of the LCD monitor 38, based on the applied graphic image data.

Figure 12:
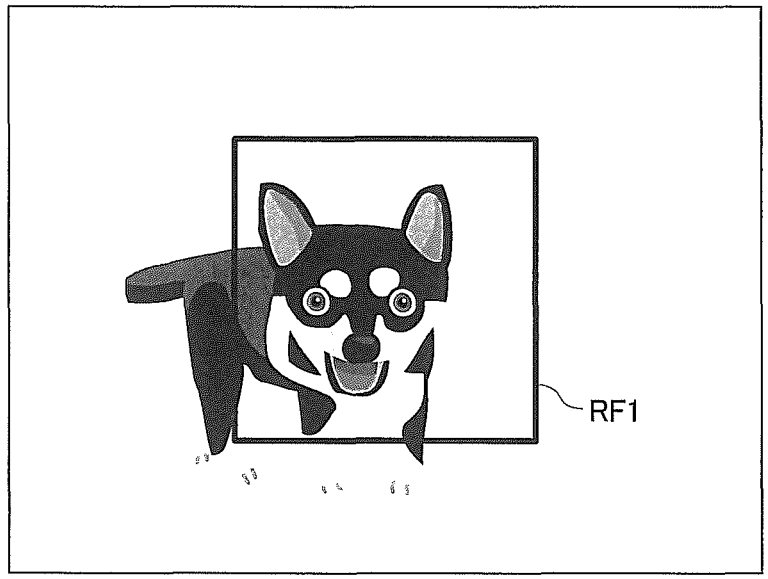
FIG. 12(A) is an illustrative view showing one example of a reproduced image.
FIG. 12(B) is an illustrative view showing one example of a reproduced image on which a zoom process and a scroll process are performed.
Figure 12:
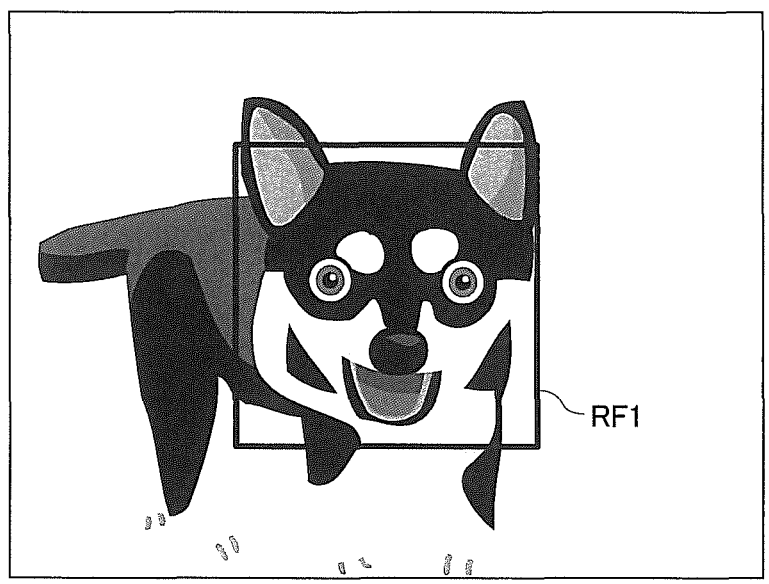

Therefore, when the display image data shown in FIG. 11(A) is recorded onto the recording medium 42 in the camera mode and this display image data is reproduced from the recording medium 42 in the reproduction mode, the reproduced image and the registration-frame-structure character RF1 are displayed on the LCD monitor 38 as shown in FIG. 12(A).

When a forward/rewind button 28*fr* of the key input device 28 is manipulated, the CPU 26 designates a succeeding image file or a preceding image file as the reproduced-image file. The designated-image file is subjected to a reproducing process similar to that described above. As a result, the reproduced image is updated.

When a tele/wide button 28*tw* of the key input device 28 is manipulated, the reproduced image displayed on the LCD monitor 38 is reduced or expanded. Thereby, the magnification of the display image is changed. When a cross button 28*cs* of the key input device 28 is manipulated, the reproduced image displayed on the LCD monitor 38 is scrolled. Thereby, a position of the display image is changed.

Therefore, if the tele/wide button 28*tw* and the cross button 28*cs* are manipulated in a state where a reproduced image shown in FIG. 12(A) is displayed, then the reproduced image is transitioned from FIG. 12(A) to FIG. 12(B), for example.

If a registration button 28*rg* of the key input device 28 is manipulated in a state where any one of the reproduced images is displayed, then in order to register one portion of the face patterns FP_1 to FP_70 contained in a general dictionary GLDC shown in FIG. 13 into the extraction dictionary EXDC, and in order to register any one of the gamma correction curves CV_0 to CV_3 shown in FIG. 14 onto the register RGST1, an extracting process is executed as follows:

In the general dictionary GLDC shown in FIG. 13, face patterns FP_1 to FP_45 represent characteristics of faces of dogs of 45 species, respectively, face patterns FP_46 to FP_60 represent characteristics of faces of cats of 15 species, respectively, and face patterns FP_61 to FP_70 represent characteristics of faces of rabbits of 10 species, respectively.

Figure 15:
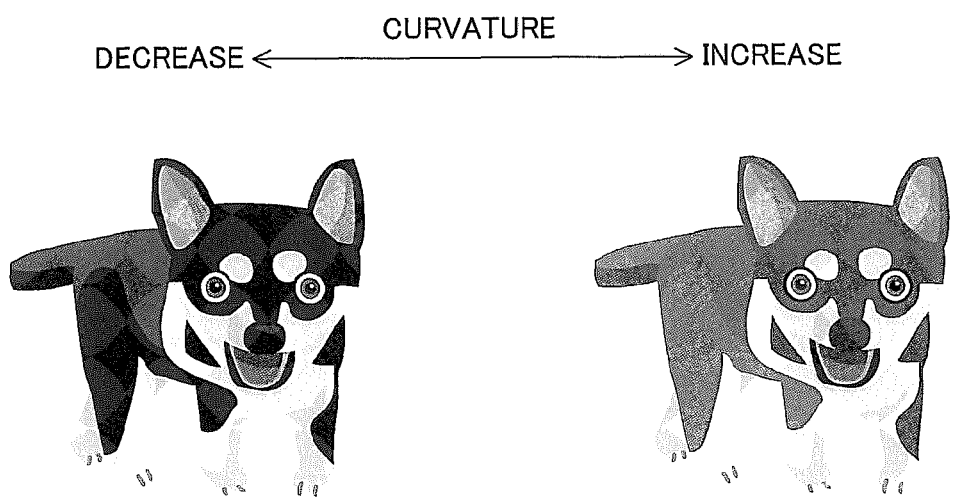
FIG. 15 is an illustrative view showing one portion of contrast adjusting behavior.

Moreover, with reference to FIG. 14, a gamma value defining a curvature of the gamma correction curve increases in the order of CV_0 to CV_1 to CV_2 to CV_3. Furthermore, the brightness of the image increases along with the increase in gamma value. Therefore, the brightness of the image of the Siberian Husky SH1 on which the gamma correcting process has been performed changes as shown in FIG. 15 according to the curvature of the referred gamma correction curve.

In the extracting process, firstly, a variable N is set to each of "0" to "3", and the contrast of the display image data accommodated in the display image area 32*b* is adjusted with reference to the gamma correction curve CV_N. Upon completion of the contrast adjustment, one portion of the display image data belonging to the registration-frame-structure character RF1 is read out from the display image area 32*b*, and the characteristic amount of the read-out display image data is calculated.

The calculated characteristic amount is checked with each of the face patterns FP_0 to FP_70 contained in the general dictionary GLDC. Together with the checking degree, the identification number of the face pattern of which the checking degree exceeds the threshold value TH is registered onto temporary registers TMP_0 to TMP_3 shown in FIG. 16(A) to FIG. 16(D).

The identification numbers of the face pattern of which the checking degree exceeds the threshold value TH and the checking degrees are registered onto the temporary register TMP_0 corresponding to the display image data adjusted with reference to the gamma correction curve CV_0, registered onto the temporary register TMP_1 corresponding to the display image data adjusted with reference to the gamma correction curve CV_1, registered onto the temporary register TMP_2 corresponding to the display image data adjusted with reference to the gamma correction curve CV_2, and registered onto the temporary register TMP_3 corresponding to the display image data adjusted with reference to the gamma correction curve CV_3.

Upon completion of the registering process on the temporary registers TMP_0 to TMP_3 in this way, a checking degree (maximum checking degree) indicating a maximum value is detected from the plurality of checking degrees registered on the temporary registers TMP_0 to TMP_3. The temporary register onto which the detected maximum checking degree is registered is designated as a noticed temporary register. Then, the two face patterns corresponding to the top two checking degrees registered on the noticed temporary register are duplicated from the general dictionary GLDC into the extraction dictionary EXDC.

Upon completion of the duplicating process, the gamma correction curve having the same identification number as the identification number of the noticed temporary register is registered onto the register RGST1. For example, if the noticed temporary register is "TMP_1", then the gamma correction curve CV_1 is registered onto the register RGST1, and if the noticed temporary register is "TMP_3", then the gamma correction curve CV_3 is registered onto the register RGST1.

The tonality of the image data applied to the gamma correcting circuit 58 (see FIG. 4) in a subsequent camera mode is adjusted corresponding to the tonalities of the face patterns FP_1 and FP_2 newly registered into the extraction dictionary EXDC. Moreover, the search image data outputted from the YUV converting circuit 60 (see FIG. 4) is checked with the face patterns FP_1 and FP_2 newly registered into the extraction dictionary EXDC.

Therefore, if the extracting process is executed in a display state shown in FIG. 12(B), the extraction dictionary EXDC is updated from a state shown in FIG. 6 to a state shown in FIG. 17, and the register RGST1 is updated from a state shown in FIG. 5 to a state shown in FIG. 18.

According to FIG. 17, the characteristic of the face of the Siberian Husky, which is one of the species of the dogs, is contained in the extraction dictionary EXDC as the face pattern FP_1, and a characteristic of a face of an Alaskan Malamute, which is another one of the species of the dogs, is contained in the extraction dictionary EXDC as the face pattern FP_2. Furthermore, according to FIG. 18, the gamma correction curve CV_3 is registered onto the register RGST1.

Figure 19:
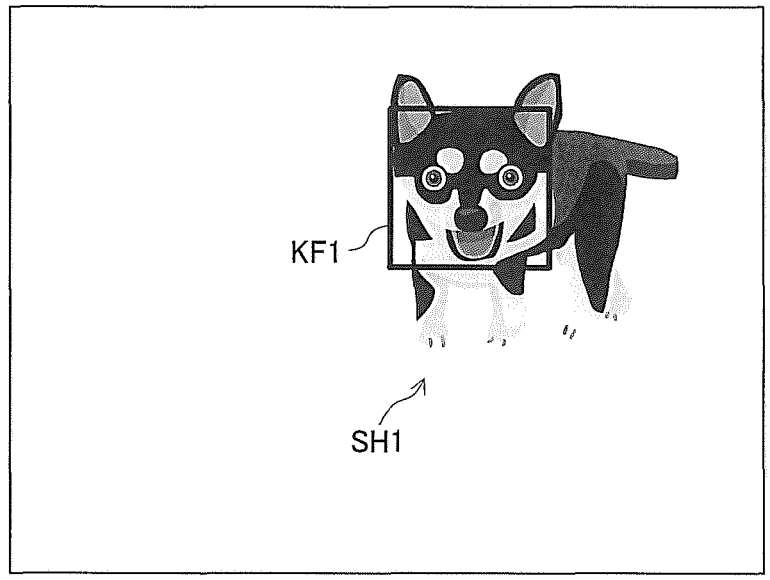
FIG. 19(A) is an illustrative view showing still another example of the display image.
FIG. 19(B) is an illustrative view showing still another example of the search image.
Figure 19:
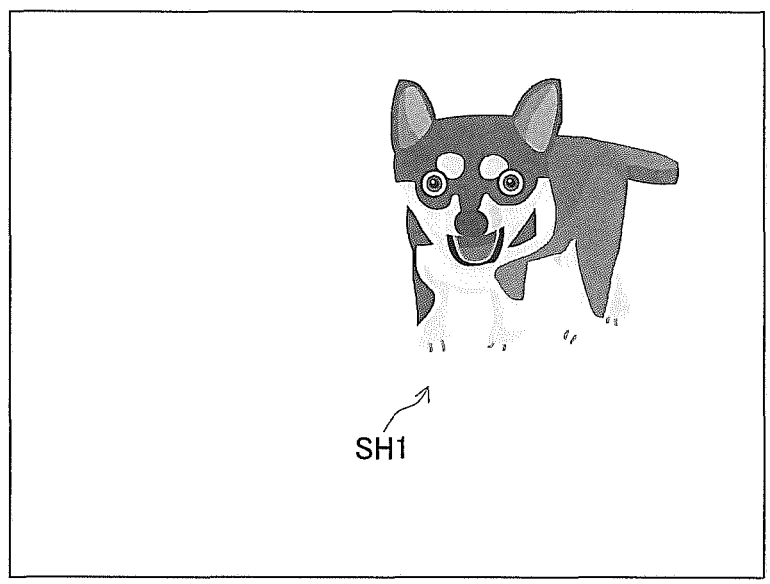

If the Siberian Husky SH1 is captured in a subsequent camera mode, then display image data shown in FIG. 19(A) and search image data shown in FIG. 19(B) are created in parallel to each other. The display image data is subjected to a display process by the LCD driver 36, and the search image data is subjected to a face detecting process by the CPU 26.

As a result of the face detecting process, the checking degree between the characteristic of the face image of the Siberian Husky SH1 and the face pattern FP_1 shown in FIG. 17 exceeds the threshold value TH. The face-frame-structure character KF1 is displayed on the LCD monitor 38 in a manner to surround the face image of the Siberian Husky SH1 (see FIG. 19(A)).

Figure 20:
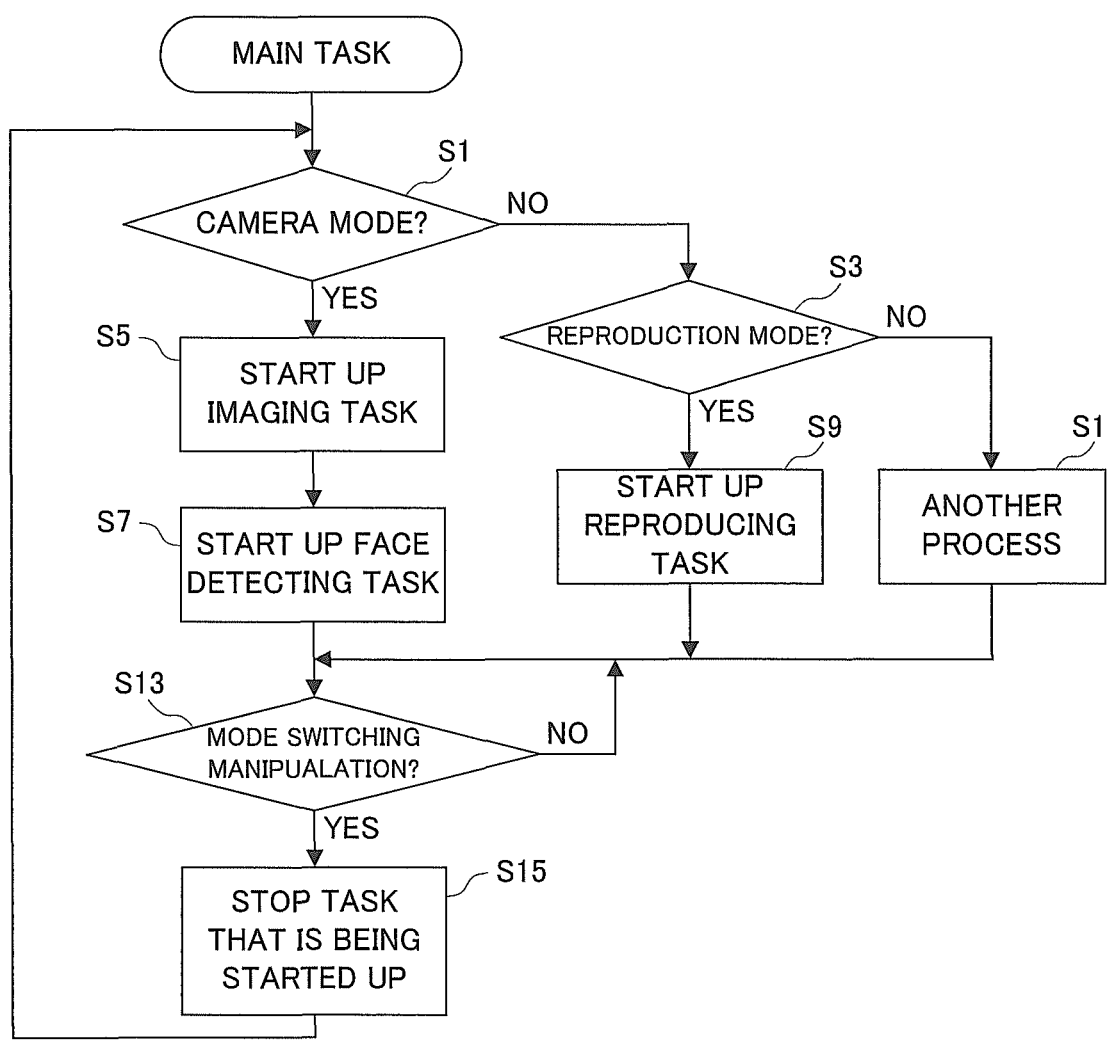
FIG. 20 is a flowchart showing one portion of behavior of a CPU applied to the embodiment in FIG. 2.
Figure 21:
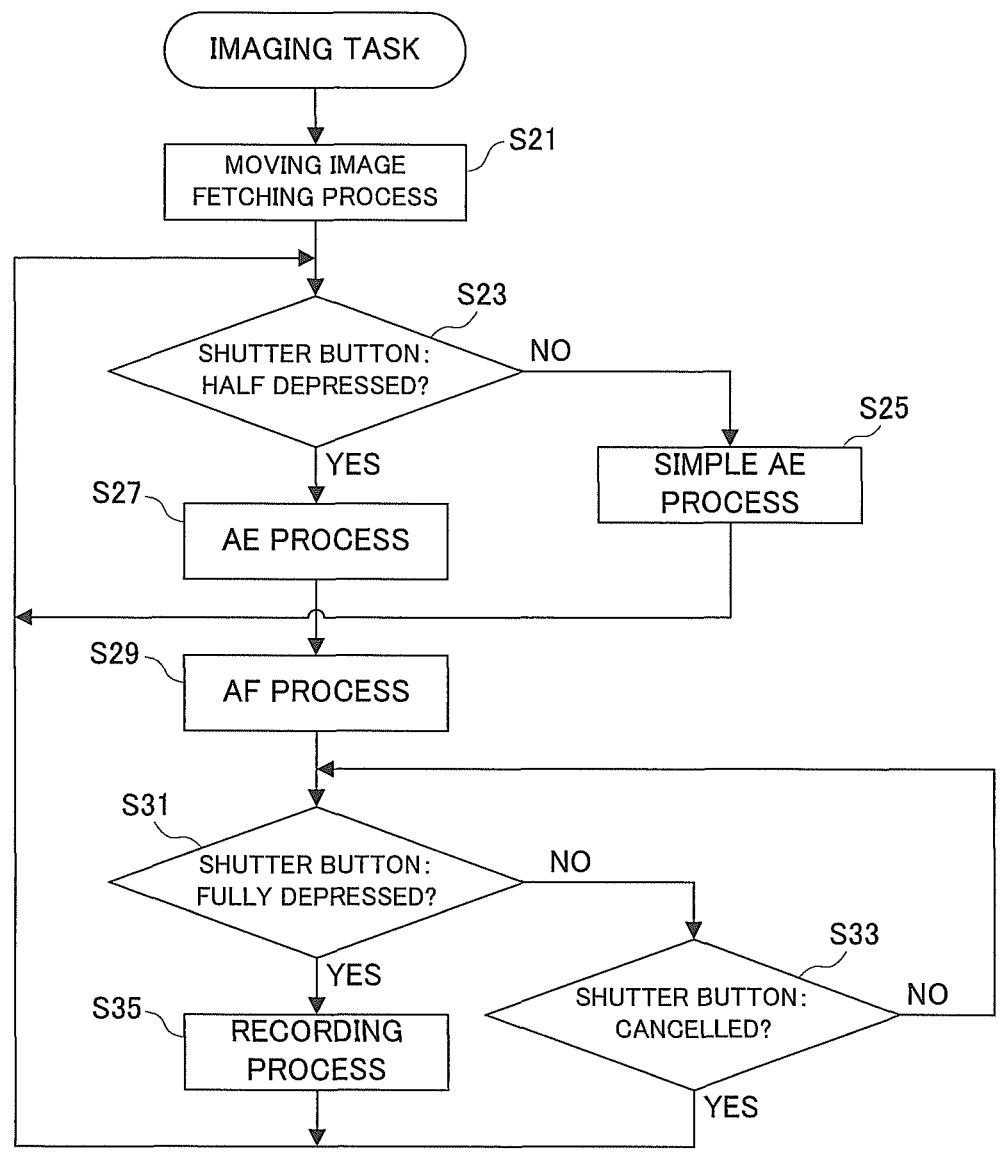
FIG. 21 is a flowchart showing another portion of the behavior of the CPU applied to the embodiment in FIG. 2.
Figure 22:
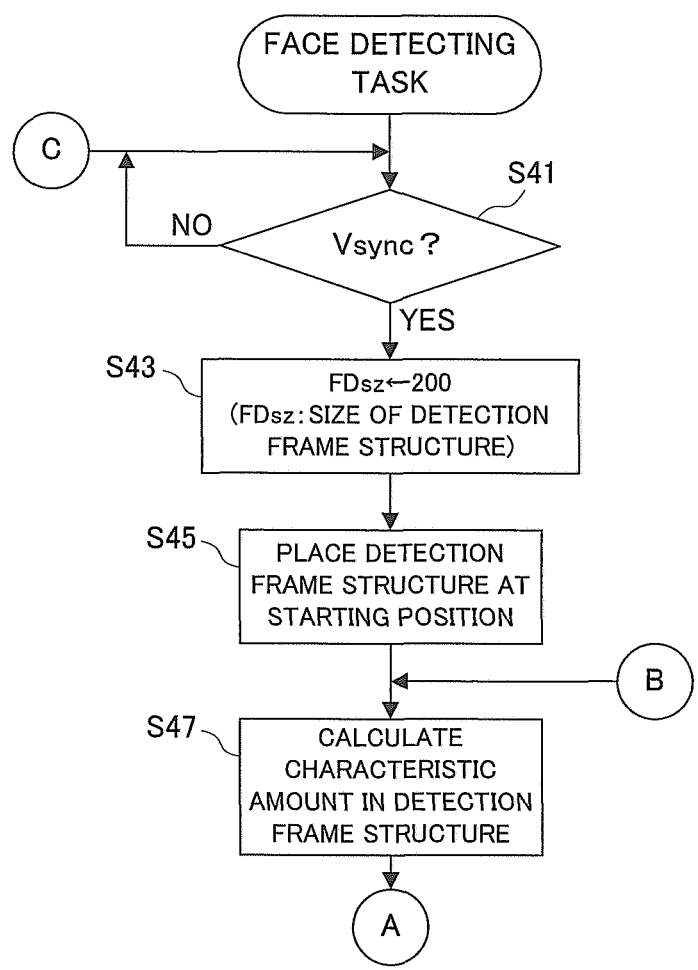
FIG. 22 is a flowchart showing still another portion of the behavior of the CPU applied to the embodiment in FIG. 2.
Figure 23:
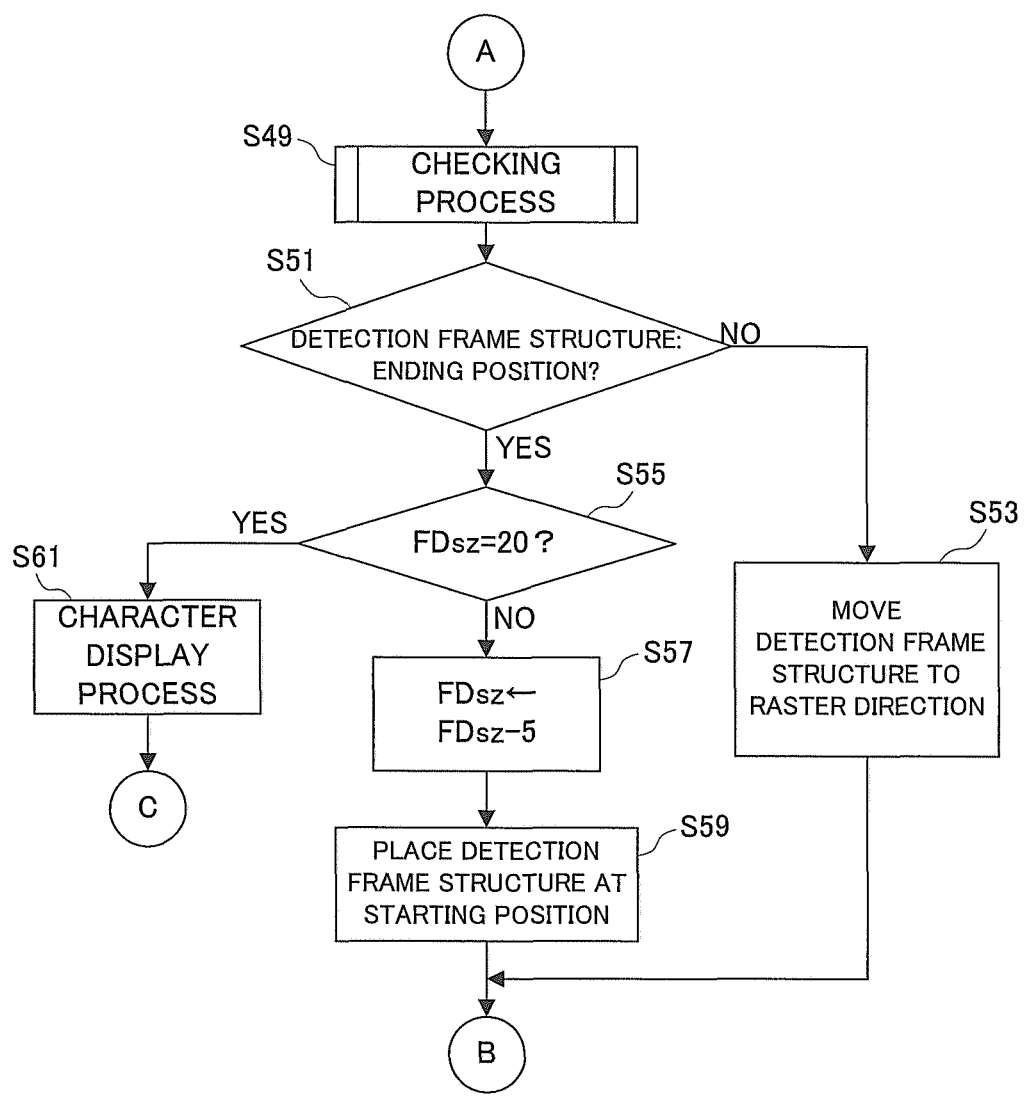
FIG. 23 is a flowchart showing yet another portion of the behavior of the CPU applied to the embodiment in FIG. 2.
Figure 24:
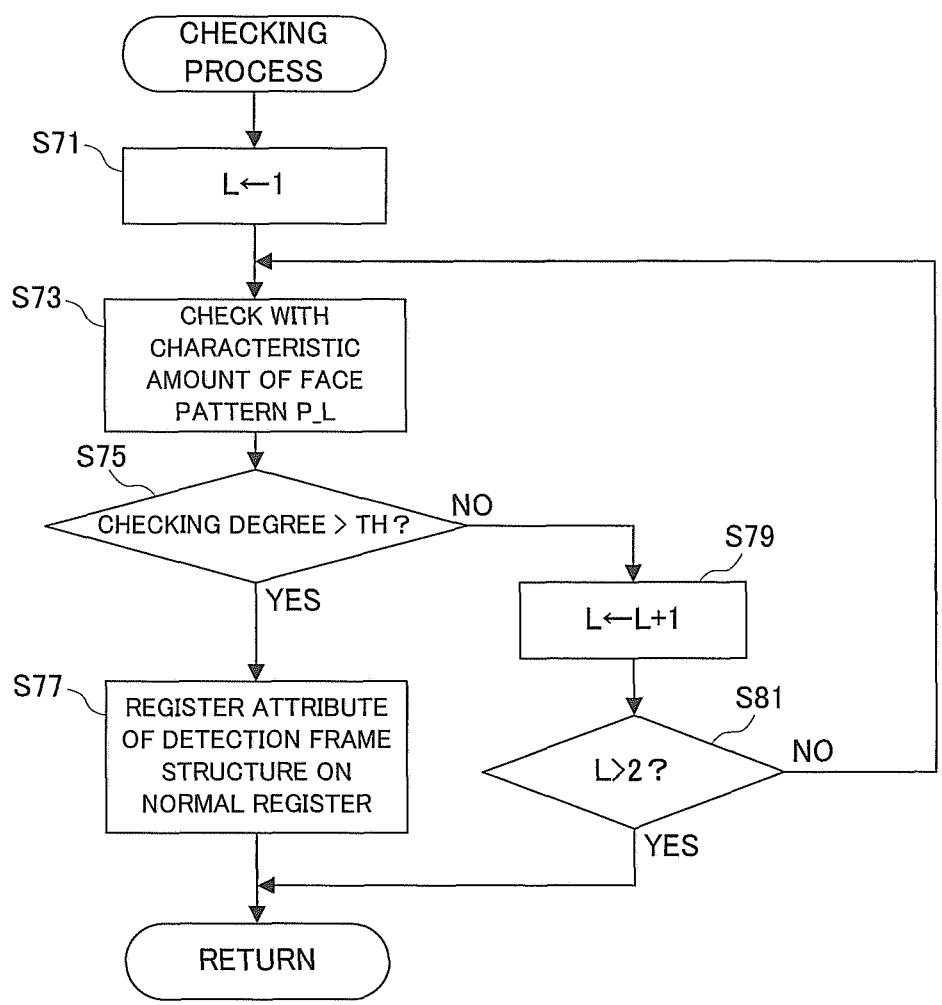
FIG. 24 is a flowchart showing another portion of the behavior of the CPU applied to the embodiment in FIG. 2.
Figure 25:
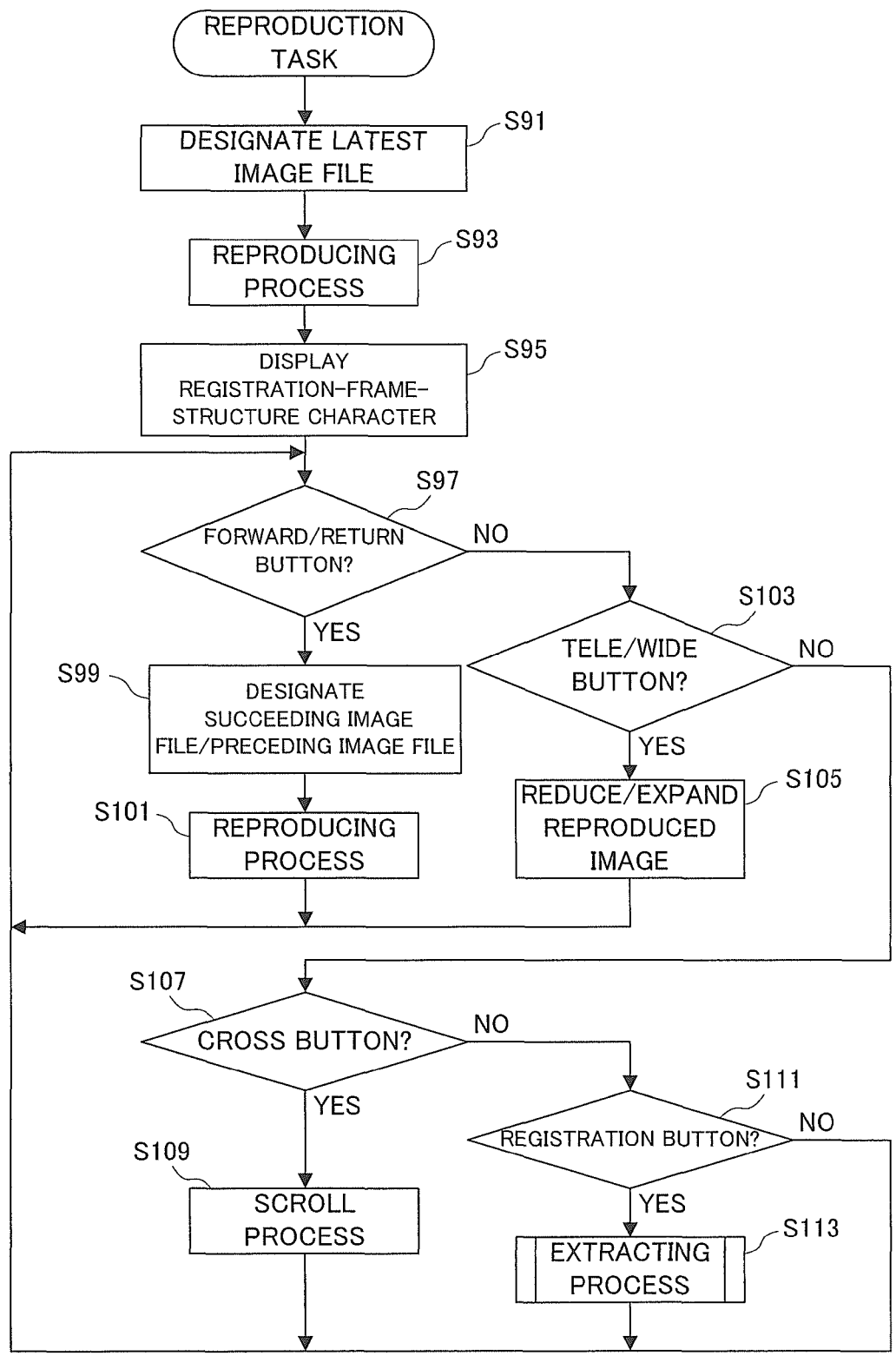
FIG. 25 is a flowchart showing still another portion of the behavior of the CPU applied to the embodiment in FIG. 2.
Figure 26:
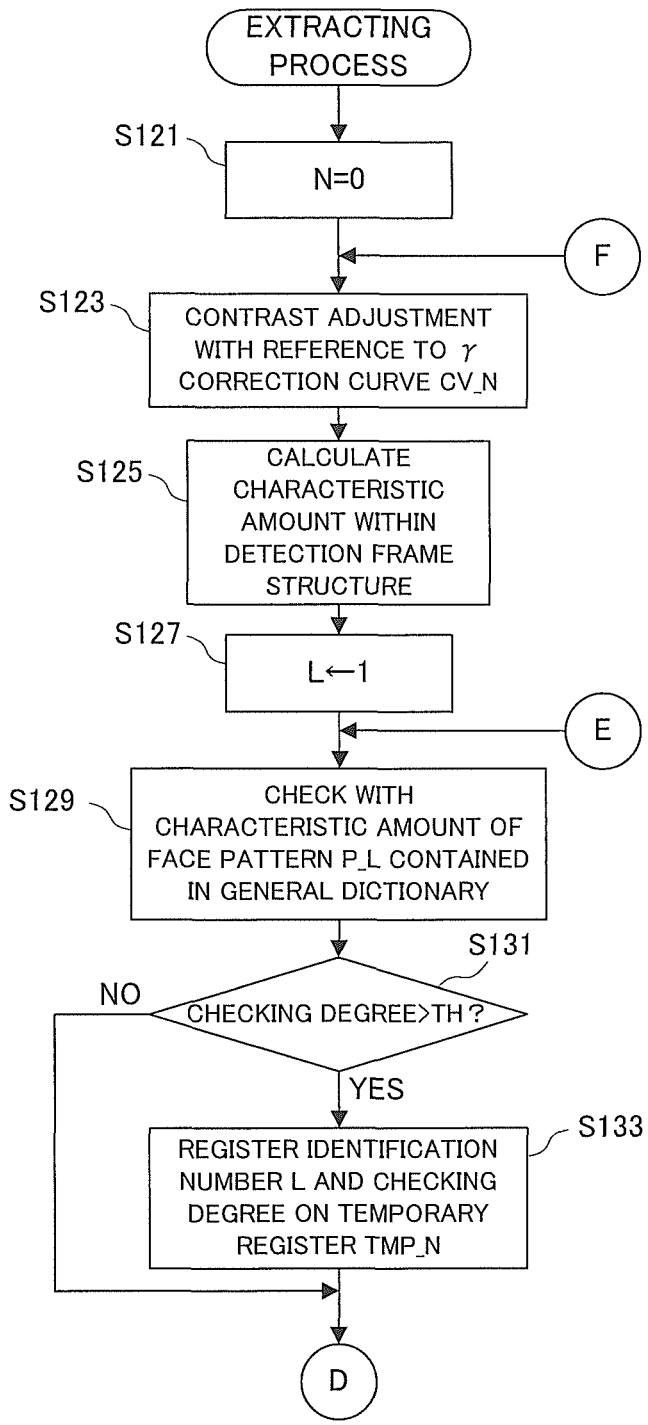
FIG. 26 is a flowchart showing yet another portion of the behavior of the CPU applied to the embodiment in FIG. 2.
Figure 27:
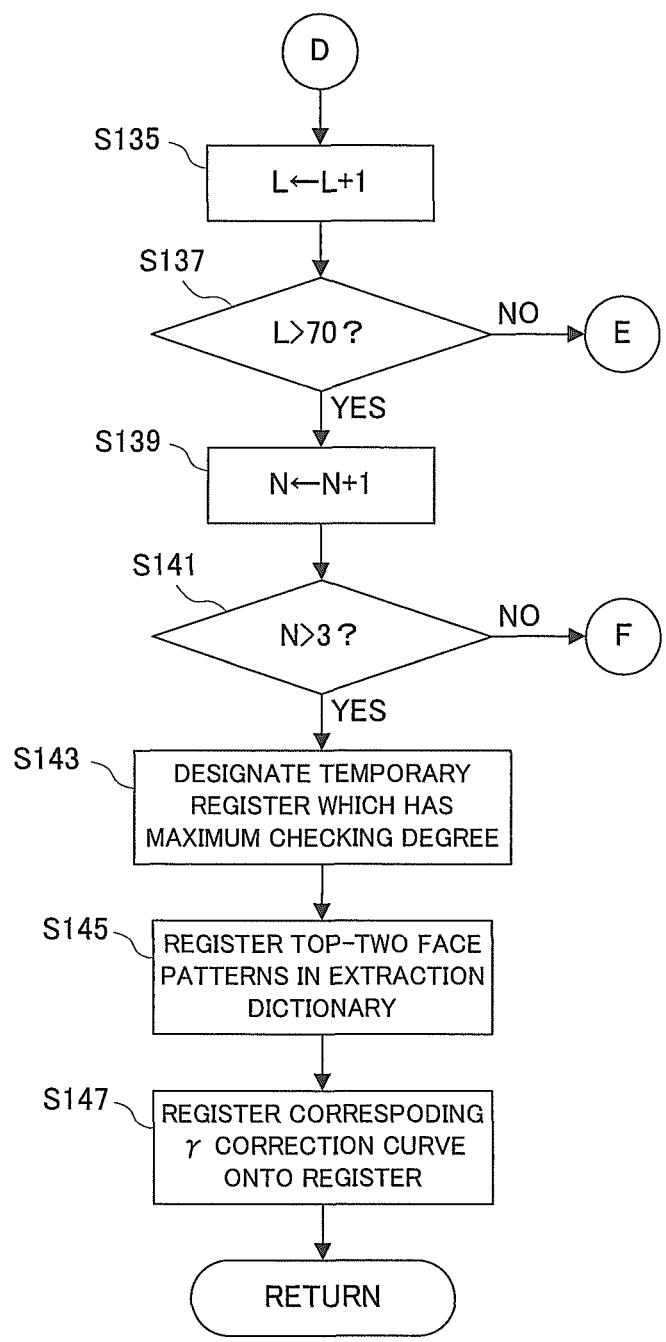
FIG. 27 is a flowchart showing another portion of the behavior of the CPU applied to the embodiment in FIG. 2.

The CPU 26 executes a plurality of tasks including a main task shown in FIG. 20, an imaging task shown in FIG. 21, a face detecting task shown in FIG. 22 to FIG. 24, and a reproducing task shown in FIG. 25 to FIG. 27, in a parallel manner. Control programs corresponding to these tasks are stored in a flash memory 44.

With reference to FIG. 20, in a step S1, it is determined whether or not the operation mode at the current time point is the camera mode, and in a step S3, it is determined whether or not the operation mode at the current time point is the reproduction mode. When YES is determined in the step S1, the imaging task is started up in a step S5 and the face detecting task is started up in a step S7. When YES is determined in the step S3, the reproducing task is started up in a step S9. When NO is determined in both the steps S1 and S3, another process is executed in a step S11. Upon completion of the process in the step S7, S9, or S11, it is repeatedly determined in a step S13 whether or not a mode switching manipulation is performed. When a determined result is updated from NO to YES, the task that is being started up is stopped in a step S15. Thereafter, the process returns to the step S1.

With reference to FIG. 21, in a step S21, the moving-image fetching process is executed. As a result, the through image representing the object scene is displayed on the LCD monitor 38. In a step S23, it is determined whether or not the shutter button 28sh is half-depressed, and as long as a determined result is NO, a simple AE process in a step S25 is repeated. As a result, the brightness of the through image is adjusted moderately. When YES is determined in the step S23, the AE process is executed in a step S27 and the AF process is executed in a step S29. Thereby, the brightness and the focus of the through image are strictly adjusted.

In a step S31, it is determined whether or not the shutter button 28sh is fully depressed. In a step S33, it is determined whether or not the manipulation of the shutter button 28sh is canceled. When YES is determined in the step S31, the process advances to a step S35 so as to execute the recording process, and thereafter, the process returns to the step S23. When YES is determined in the step S33, the process directly returns to the step S23. As a result of the recording process in the step S35, the image data representing the object scene at the time point at which the shutter button 28sh is fully depressed is recorded onto the recording medium 42 in a file format.

With reference to FIG. 22, in a step S41, it is determined whether or not the vertical synchronization signal Vsync is generated. When a determined result is updated from NO to YES, the size of the face-detection frame structure FD is set to "200" in a step S43, and the face-detection frame structure FD is placed at a starting position (upper left of the evaluation area EVA) in a step S45. In a step S47, one portion of the image data belonging to the face-detection frame structure FD is read out from the search image area 32c, and the characteristic amount of the read-out image data is calculated.

In a step S49, a checking process for checking the calculated characteristic amount with each of the face patterns FP_1 and FP_2 contained in the extraction dictionary EXDC is executed. Upon completion of the checking process, it is determined in a step S51 whether or not the face-detection frame structure FD reaches an ending position (lower right of the evaluation area EVA).

When a determined result is NO, in a step S53, the face-detection frame structure FD is moved in a raster direction by a predetermined amount, and thereafter, the process returns to the step S47. When a determined result is YES, it is determined in a step S55 whether or not the size of the face-detection frame structure FD) is reduced to "20". When the determined result is NO, the size of the face-detection frame structure FD is reduced by "5" in a step S57, and the face-detection frame structure is placed at a starting position in a step S59. Thereafter, the process returns to the step S47.

When a determined result in the step S55 is YES, the process advances to a step S61 so as to detect the face-frame-structure information described on the register RGST2 and issue the face-frame-structure character display command corresponding to the detected face-frame-structure information toward the graphic generator 46. However, in a case where there is no face-frame-structure information on the register RGST2, the issuance of the face-frame-structure character display command is cancelled. As a result, the face-frame-structure character KF1 is displayed on the through image in an OSD manner. Upon completion of the process in the step S61, the process returns to the step S41.

The checking process in the step S49 shown in FIG. 23 is executed according to a subroutine shown in FIG. 24. Firstly, in a step S71, a variable L is set to "1". In a step S73, the characteristic amount of the image data belonging to the face-detection frame structure FD is checked with the face pattern FP_L contained in the extraction dictionary EXDC. In a step S75, it is determined whether or not the checking degree exceeds the threshold value TH.

When the determined result is NO, the variable L is incremented in a step S79. In a step S81, it is determined whether or not the incremented variable L exceeds "2". Then, when $L \leq 2$ is established, the process returns to the step S73 while when $L > 2$ is established, the process is restored to the routine at an upper hierarchical level. When YES is determined in the step S75, the process advances to a step S77 so as to describe the current position and the current size of the face-detection frame structure FD, as the face-frame-structure information, onto the register RGST2. Upon completion of the process in the step S77, the process is restored to the routine at an upper hierarchical level.

With reference to FIG. 25, in a step S91, the latest image file recorded on the recording medium 42 is designated, and in a step S93, the reproducing process in which the designated image file is noticed is executed. As a result, the display image data contained in the designated image file is transferred to the display image area 32b of the SDRAM 32, and the reproduced image based on this display image data is displayed on the LCD monitor 38. In a step S95, the registration-frame-structure character display command is issued toward the graphic generator 46. As a result, the registration-frame-structure character RF1 is displayed on the through image in an OSD manner.

In a step S97, it is determined whether or not the forward/rewind button 28fr is manipulated. In a step S103, it is determined whether or not the tele/wide button 28tw is manipulated. Moreover, in a step S107, it is determined whether or not the cross button 28cs is manipulated, and in a step S111, it is determined whether or not the registration button 28rg is manipulated.

When a determined result in the step S97 is YES, the process advances to a step S99 so as to designate the succeeding image file or the preceding image file as a subsequent reproduced-image file. Upon completion of the process in the step S99, a reproducing process similar to that described above is executed in a step S101. Thereafter, the process returns to the step S97.

When a determined result in the step S103 is YES, the process advances to a step S105 so as to reduce or expand the reproduced image displayed on the LCD monitor 38. Thereby, the magnification of the display image is changed. Upon completion of the reducing/expanding process, the process returns to the step S97.

When a determined result in the step S107 is YES, the process advances to a step S109 so as to scroll the reproduced image displayed on the LCD monitor 38. Thereby, the position of the reproduced image to be displayed is changed. Upon completion of the scroll process, the process returns to the step S97.

When YES is determined in the step S111, the process advances to a step S113 so as to execute the extracting process for registering one portion of the face patterns FP_1 to FP_70 contained in the general dictionary GLDC into the extraction dictionary EXDC. Upon completion of the extracting process, the process returns to the step S97.

The extracting process in the step S113 is executed according to a subroutine shown in FIG. 26. In a step S121, a variable N is set to "0". In a step S123, the contrast of the display image data accommodated in the display image area 32b is adjusted with reference to the gamma correction curve CV_N. In a step S125, one portion of the display image data belonging to the registration-frame-structure character RF1 is read out from the display image area 32b, and the characteristic amount of the read-out display image data is calculated.

In a step S127, the variable L is set to "1". In a step S129, the characteristic amount calculated in the step S125 is checked with the face pattern FP_L contained in the general dictionary GLDC. In a step S131, it is determined whether or not the checking degree exceeds the threshold value TH. When a determined result is NO, the process directly advances to a step S135 while when the determined result is YES, the process advances to the step S135 via a process in a step S133. In the step S133, the identification number L and the checking degree associated with each other are registered onto the temporary register TMP_N.

In the step S135, the variable L is incremented. In a step S137, it is determined whether or not the incremented variable L exceeds "70" equivalent to the number of the face patterns registered in the general dictionary GLDC. When a determined result is NO, the process returns to the step S129. When the determined result is YES, the process advances to a step S141 after incrementing the variable N in a step S139. In the step S141, it is determined whether or not the variable N exceeds "3". When a determined result is NO, the process returns to the step S123 while when the determined result is YES, the process advances to a step S143.

In the step S143, the maximum checking degree is detected from among the plurality of checking degrees registered on the temporary registers TMP_0 to TMP_3, and the temporary register on which the detected maximum checking degree is registered is designated as the noticed temporary register. In a step S145, the two face patterns corresponding to the top two checking degrees registered on the noticed temporary register are detected from the general dictionary GLDC, and the detected face patterns are registered in the extraction dictionary EXDC. In a step S147, the gamma correction curve having the same identification number as the identification number of the noticed temporary register is registered onto the register RGST1. Upon completion of the process in the step S147, the process is restored to the routine at an upper hierarchical level.

As can be seen from the above-described explanation, the object scene image is fetched by the memory control circuit 30 into the SDRAM 32. The gamma correcting circuit 54 of the post-processing circuit 34 adjusts the tonality of the object scene image fetched to the SDRAM 32, corresponding to the property of the LCD monitor 38. The object scene image having the adjusted tonality is displayed on the LCD monitor 38 by the LCD driver 36. Furthermore, the gamma correcting circuit 58 arranged in the post-processing circuit 34 adjusts the tonality of the object scene image fetched to the SDRAM 32, corresponding to the tonality of the registered face pattern. Moreover, in parallel to each other, the gamma correcting circuits 54 and 58 execute the tonality adjusting process. The CPU 26 searches for the object image that coincides with the registered face pattern from the object scene image having the tonality adjusted by the gamma correcting circuit 58 (S41 to S59).

Therefore, the tonality of the object scene image outputted toward the LCD monitor 38 is adjusted corresponding to the property of the LCD monitor 38 while the object scene image that is a subject to be searched of the object image that coincides with the registered face pattern is adjusted irrespective of the property of the LCD monitor 38. This enables improvement of both a performance of reproducing the object image that coincides with the registered face pattern and a performance of searching for the same.

It is noted that in the extracting process according to this embodiment, the four searching processes (S125 to S137) respectively corresponding to the gamma correction curves CV_0 to CV_3 are to be executed. However, if the gamma correction curve is finalized before the searching process, then a single searching process may suffice.

Figure 28:
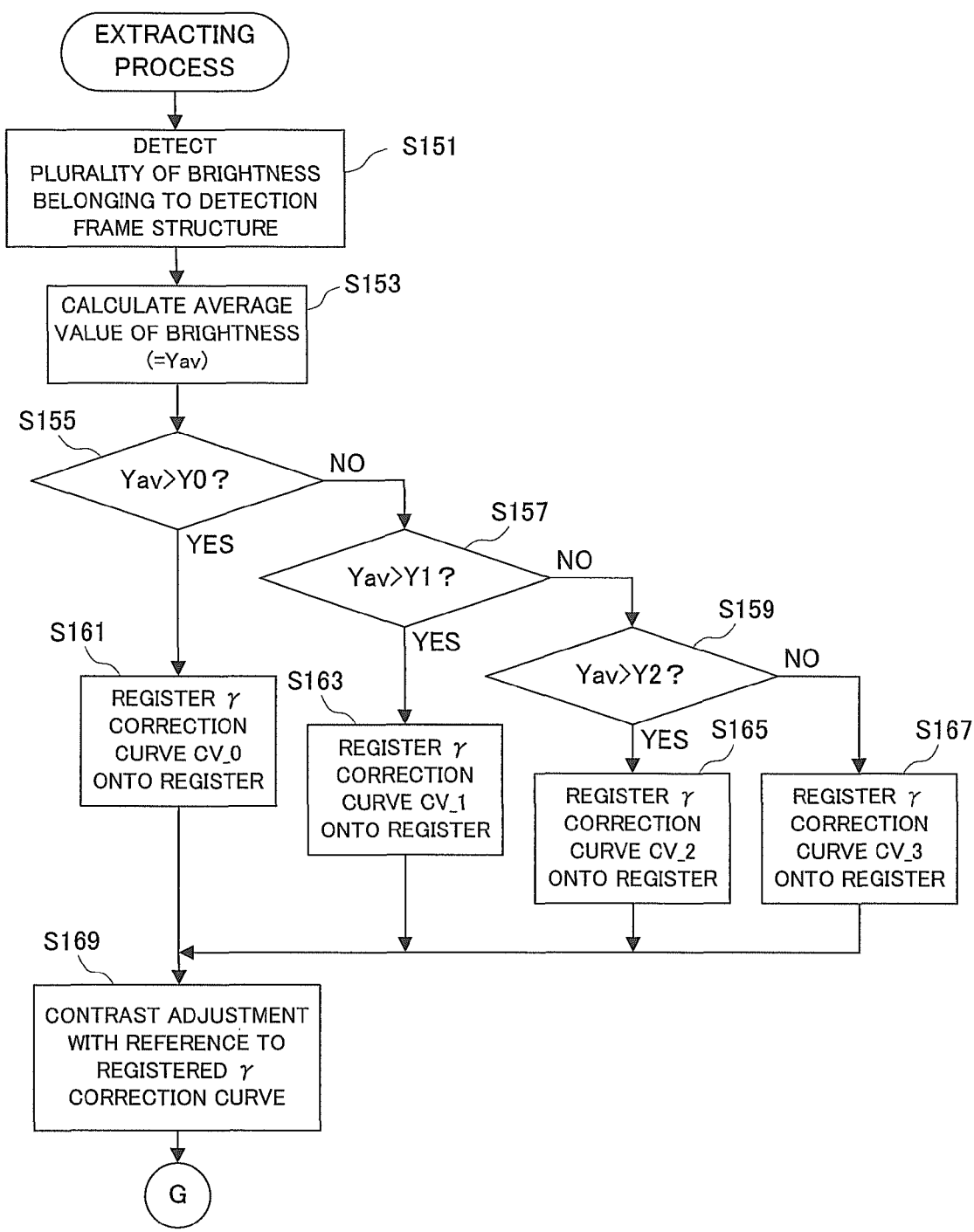
FIG. 28 is a flowchart showing one portion of behavior of the CPU applied to another embodiment.
Figure 29:
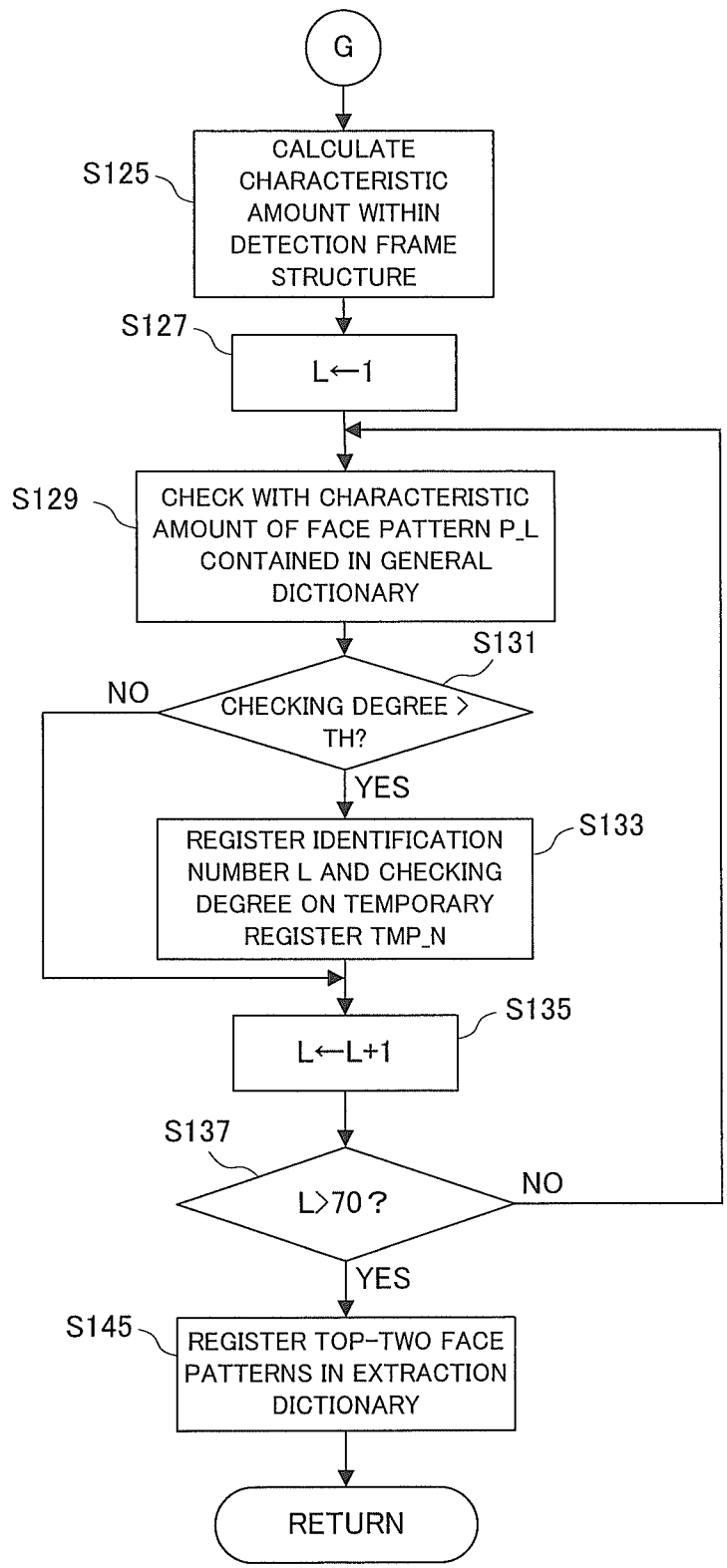
FIG. 29 is a flowchart showing another portion of the behavior of the CPU applied to another embodiment.

In this case, the CPU 26 executes an extracting process shown in FIG. 28 and FIG. 29, instead of the extracting process shown in FIG. 26 and FIG. 27.

Firstly, in a step S151, a plurality of brightness respectively corresponding to a plurality of positions on the display image data belonging to the registration-frame-structure character RF1 are detected. In a step S153, an average value of the plurality of detected brightness is calculated as "Yav". In a step S155, it is determined whether or not the average value Yav exceeds a reference value Y0. In a step S157, it is determined whether or not the average value Yav exceeds a reference value Y1. In a step S159, it is determined whether or not the average value Yav exceeds a reference value Y2. It is noted that among the reference values Y0 to Y2, a relationship of Y0>Y1>Y2 is established.

When YES is determined in the step S155, the process advances to a step S161 so as to register the gamma correction curve CV_0 onto the register RGST1. When YES is determined in the step S157, the process advances to a step S163 so as to register the gamma correction curve CV_1 onto the register RGST1. When YES is determined in the step S159, the process advances to a step S165 so as to register the gamma correction curve CV_2 onto the register RGST1. When NO is determined in the step S159, the process advances to a step S167 so as to register the gamma correction curve CV_3 onto the register RGST1.

Upon completion of the process in the step S161, 5163, S165, or S167, the process advances to a step S169 so as to adjust the contrast of the display image data accommodated in the display image area 32b with reference to the gamma correction curve registered on the register RGST1. Upon completion of the contrast adjustment, the processes in the above-described steps S125 to S137 and S145 are executed. Thereafter, the process is restored to the routine at an upper hierarchical level.

Figure 30:
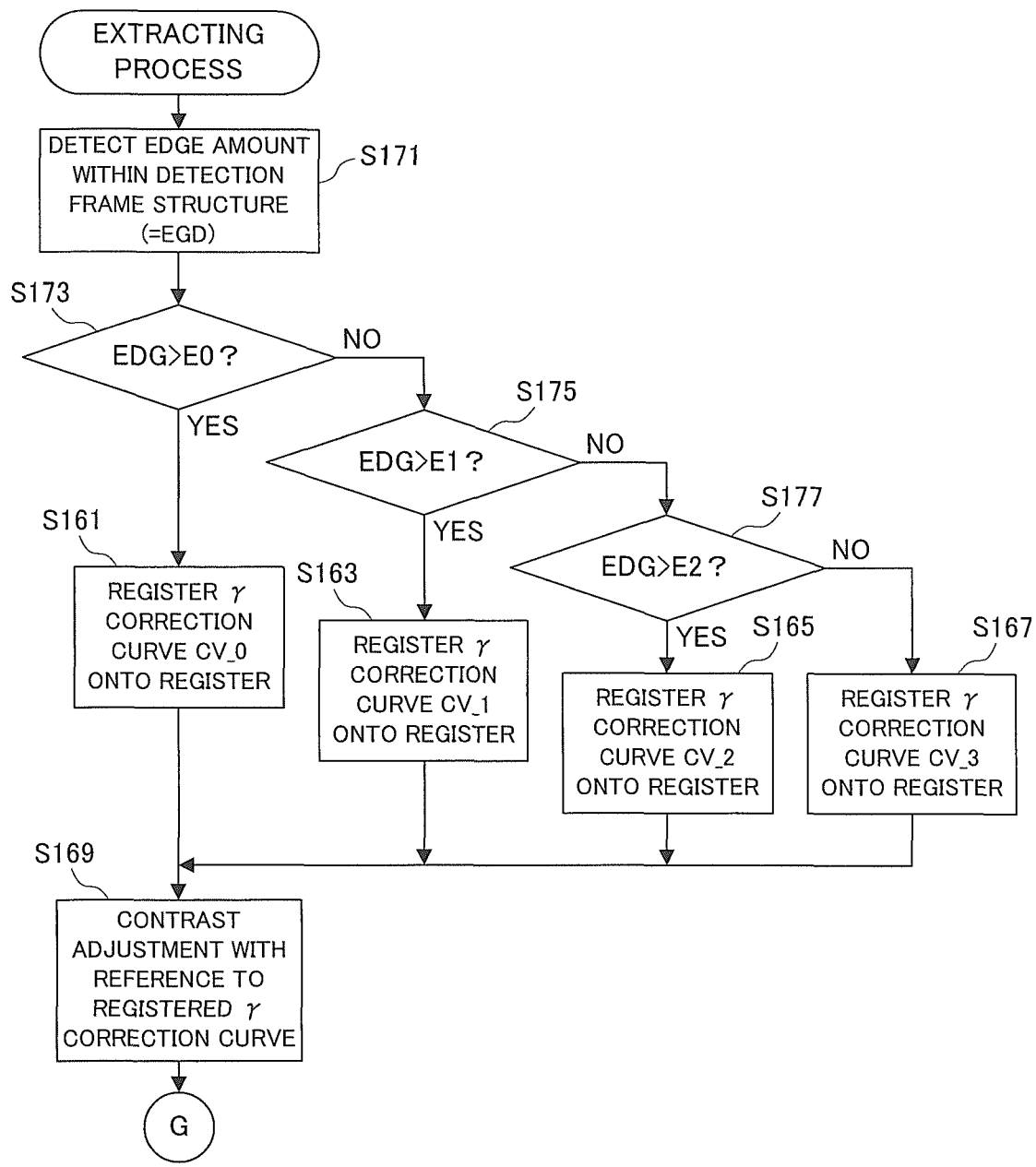
FIG. 30 is a flowchart showing one portion of behavior of the CPU applied to still another embodiment.

The CPU 26 may optionally execute processes in steps S171 to S177 shown in FIG. 30, instead of the processes in the steps S151 to S159 shown in FIG. 28.

Firstly, in the step S171, an edge amount of the display image data belonging to the registration-frame-structure character RF1 is detected as "EDG". In the step S173, it is determined whether or not the edge amount EDG exceeds a reference value E0. In the step S175, it is determined whether or not the edge amount EDG exceeds a reference value E1. In the step S177, it is determined whether or not the edge amount EDG exceeds a reference value E2. It is noted that among the reference values E0 to E2, a relationship of E0>E1>E2 is established.

When YES is determined in the step S173, the process advances to the step S161, when YES is determined in the step S175, the process advances to the step S163, when YES is determined in the step S177, the process advances to the step S165, and when NO is determined in the step S177, the process advances to the step S167.

Figure 31:
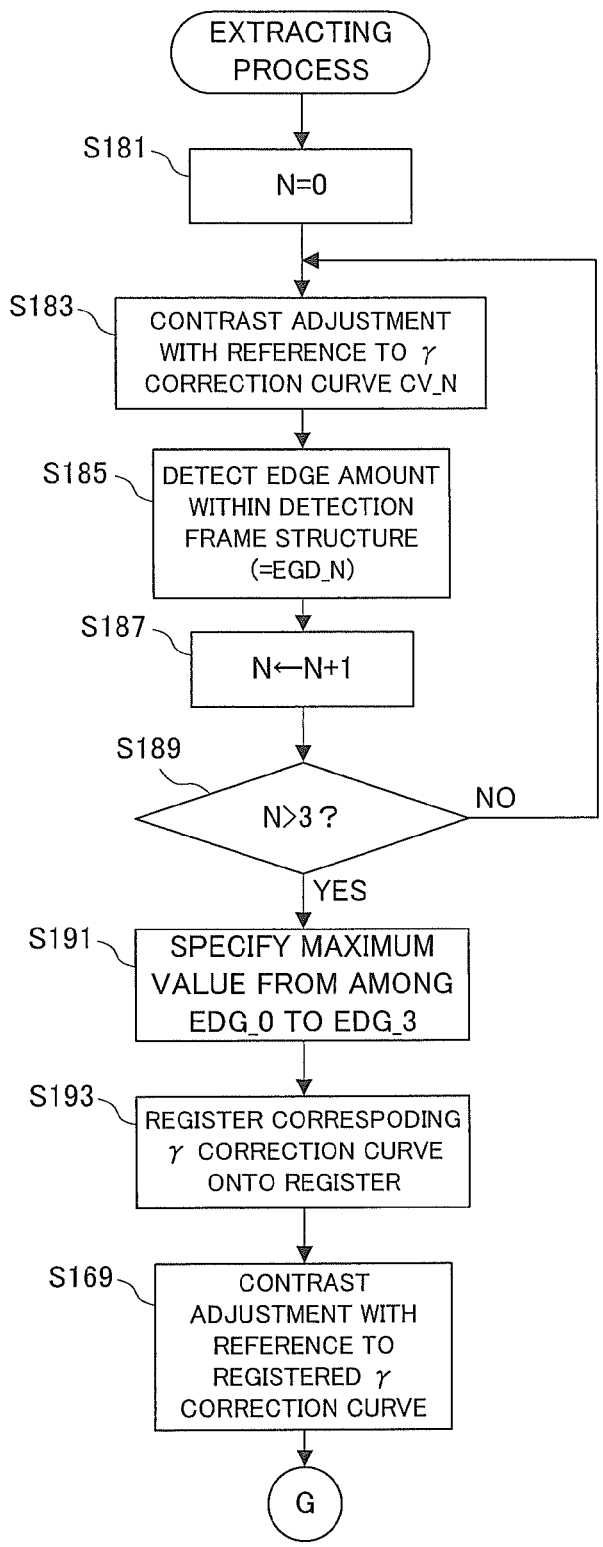
FIG. 31 is a flowchart showing one portion of behavior of the CPU applied to yet another embodiment.

Furthermore, the CPU 26 may optionally execute processes in steps S181 to S193 shown in FIG. 31, instead of the processes in the steps S151 to S167 shown in FIG. 28.

Firstly, in the step S181, a variable N is set to "0". In the step S183, the contrast of the display image data accommodated in the display image area 32b is adjusted with reference to the gamma correction curve CV_N. In the step S185, the edge amount of one portion of the display image data belonging to the registration-frame-structure character RF1 is detected as "EDG_N".

In the step S187, the variable N is incremented. In the step S189, it is determined whether or not the variable N exceeds "3". When a determined result is NO, the process returns to the step S183, and when the determined result is YES, the process advances to the step S191. In the step S191, a maximum value is specified from among the edge amounts EDG_0 to EDG_3. In the step S193, the gamma correction curve corresponding to the maximum value specified in the step S191 is registered onto the register RGST1.

Figure 32:
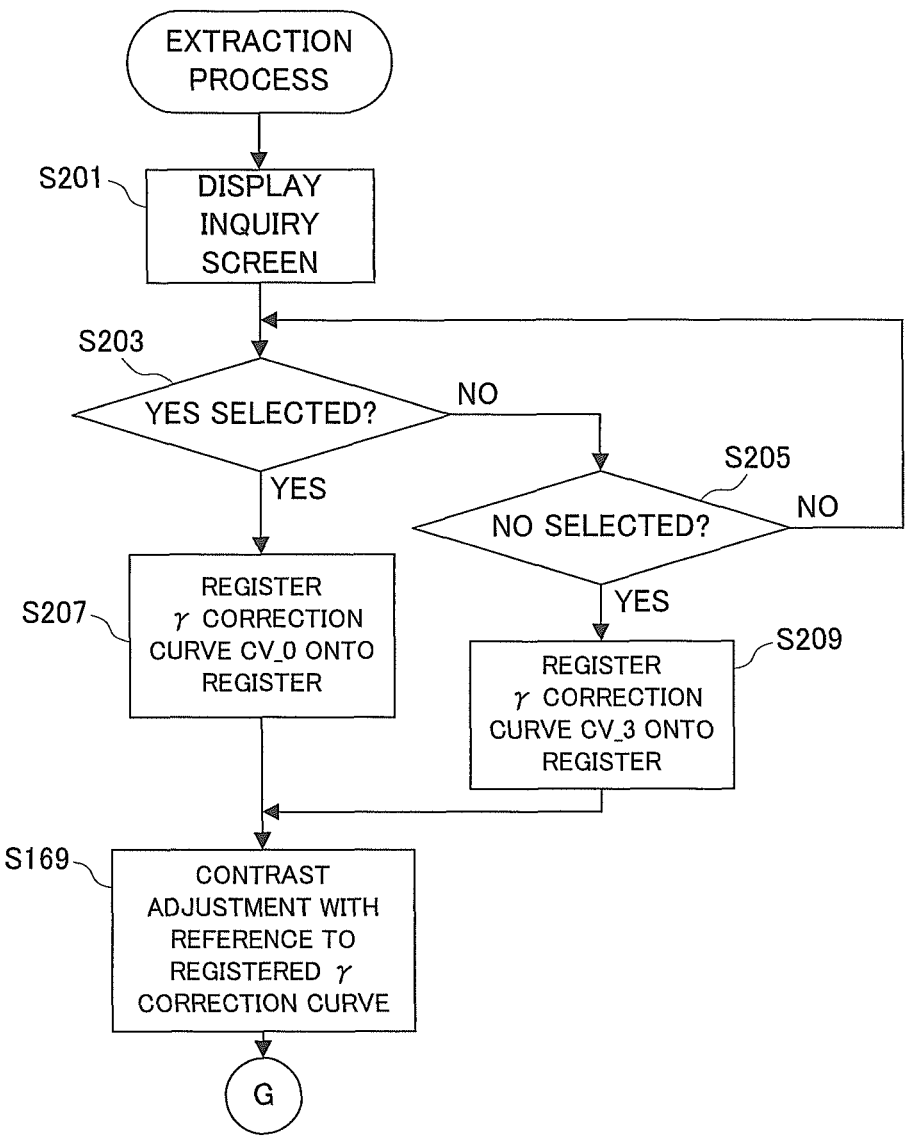
FIG. 32 is a flowchart showing one portion of behavior of the CPU applied to another embodiment.

The CPU 26 may optionally execute processes in steps S201 to 5209 shown in FIG. 32, instead of the processes in the steps S151 to S167 shown in FIG. 28.

Figure 33:
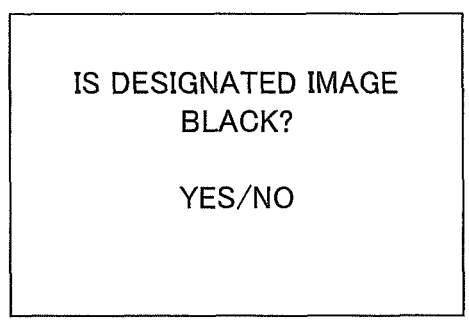
FIG. 33 is an illustrative view showing one example of an inquiry screen displayed in another embodiment.

In the step S201, the graphic generator 46 is controlled so as to display an inquiry screen shown in FIG. 33 on the LCD monitor 38. According to FIG. 33, the inquiry screen has an inquiry message of "Is designated image black?" and items of "YES" and "NO". In the step S203, it is determined whether or not the item of "YES" is selected by an operator. In the step S205, it is determined whether or not the item of "NO" is selected by the operator. When a determined result in the step S203 is YES, the process advances to the step S207 so as to register the gamma correction curve CV_0 onto the register RGST1. On the other hand, when the determined result in the step S205 is YES, the process advances to the step S209 so as to register the gamma correction curve CV_3 onto the register RGST1.

It is noted that in this embodiment, upon designation of the desired object image, the manipulations of the tele/wide button 28tw, the cross button 28cs, and the registration button 28rg are required. However, instead of these button manipulations, touch manipulations on the monitor screen may be optionally required. Moreover, in this embodiment, the designating manipulation of the desired object image is accepted in the reproduction mode; however, the designating manipulation of the desired object image may also be optionally accepted in the camera mode. Furthermore, in this embodiment, a still camera which records a still image is assumed; however, it is also possible to apply the present invention to a movie camera which records a moving image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a fetcher which fetches an object scene image;
   a first adjuster which adjusts a tonality of the object scene image fetched by said fetcher, corresponding to a property of a display device;
   an object-scene-image outputter which outputs the object scene image having the tonality adjusted by said first adjuster, toward the display device;
   a second adjuster which adjusts the tonality of the object scene image fetched by said fetcher, in parallel with the adjusting process of said first adjuster; and
   a first searcher which searches for an object image that coincides with a registered object image from the object scene image having the tonality adjusted by said second adjuster.

2. An image processing apparatus according to claim 1, further comprising a graphic image outputter which outputs a graphic image directed at the object image discovered by said first searcher, toward the display device.

3. An image processing apparatus according to claim 1, wherein said object-scene-image outputter and said graphic image outputter execute an output process in parallel to each other.

4. An image processing apparatus according to claim 1, further comprising:
   an accepter which accepts a designating manipulation for designating the object image on the object scene image fetched by said fetcher;
   a second searcher which searches for a predetermined object image that coincides with the object image designated by the designating manipulation from among a plurality of predetermined object images; and
   a definer which defines, as the registered object image, the predetermined object image discovered by said second searcher.

5. An image processing apparatus according to claim 4, wherein the plurality of predetermined object images include a plurality of animal images respectively corresponding to a plurality of species and the designating manipulation is equivalent to a manipulation for designating an animal image.

6. An image processing apparatus according to claim 4, further comprising:
   a setter which sets the tonality of the object image designated by the designating manipulation to each of a plurality of tonalities different from one another; and
   a first determiner which determines a parameter referred to for the tonality adjustment of said second adjuster, based on a searched result of said second searcher in which the object image having the tonality set by said setter is noticed.

7. An image processing apparatus according to claim 4, further comprising:
   an attribute detector which detects an attribute of the object image designated by said designator; and
   a second determiner which determines a parameter referred to for the tonality adjustment of said second adjuster, based on the attribute detected by said attribute detector.

8. An image processing apparatus according to claim 7, wherein the attribute includes a plurality of brightness respectively corresponding to a plurality of positions on the object image.

9. An image processing apparatus according to claim 7, wherein the attribute includes an edge amount of the object image.

10. An image processing apparatus according to claim 7, wherein the attribute includes a color of the object image.

11. An image processing apparatus according to claim 1, further comprising an imager which has an imaging surface on which an object scene is captured and which produces an object scene image, wherein said fetcher fetches the object scene image produced by said imager.

12. An image processing apparatus according to claim 11, further comprising an imaging condition adjuster which adjusts an imaging condition by noticing the object image discovered by said first searcher.

\* \* \* \* \*